United States Patent
Ohsawa et al.

(10) Patent No.: US 11,664,489 B2
(45) Date of Patent: May 30, 2023

(54) NEGATIVE ELECTRODE FOR NON-AQUEOUS ELECTROLYTE SECONDARY BATTERY AND NON-AQUEOUS ELECTROLYTE SECONDARY BATTERY USING THE SAME

(71) Applicant: NISSAN MOTOR CO., LTD., Yokohama (JP)

(72) Inventors: Yasuhiko Ohsawa, Kanagawa (JP); Yuki Kusachi, Kanagawa (JP); Hajime Satou, Kanagawa (JP); Hiroshi Akama, Kanagawa (JP); Hideaki Horie, Kanagawa (JP); Hideki Nishimura, Kyoto (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 249 days.

(21) Appl. No.: 16/495,148

(22) PCT Filed: Mar. 26, 2018

(86) PCT No.: PCT/JP2018/012180
§ 371 (c)(1),
(2) Date: Sep. 18, 2019

(87) PCT Pub. No.: WO2018/174299
PCT Pub. Date: Sep. 27, 2018

(65) Prior Publication Data
US 2020/0020926 A1    Jan. 16, 2020

(30) Foreign Application Priority Data
Mar. 24, 2017    (JP) .............................. JP2017-059425

(51) Int. Cl.
*H01M 4/62*        (2006.01)
*H01M 4/133*       (2010.01)
(Continued)

(52) U.S. Cl.
CPC ............ *H01M 4/133* (2013.01); *H01M 4/134* (2013.01); *H01M 4/366* (2013.01); *H01M 4/386* (2013.01);
(Continued)

(58) Field of Classification Search
CPC ...... H01M 4/133; H01M 4/587; H01M 4/386; H01M 4/366; H01M 4/622; H01M 4/134;
(Continued)

(56) References Cited

U.S. PATENT DOCUMENTS

2004/0131934 A1    7/2004  Sugnaux et al.
2006/0035149 A1    2/2006  Nanba et al.
(Continued)

FOREIGN PATENT DOCUMENTS

CN        1202015      * 12/1998   .............. H01M 4/24
JP        2000-182606 A    6/2000
(Continued)

OTHER PUBLICATIONS

Machine translation of CN 1202015, retrieved from <www.espacenet.com> on Jan. 4, 2023. (Year: 1998).*

*Primary Examiner* — Cynthia K Walls
(74) *Attorney, Agent, or Firm* — Foley & Lardner LLP

(57)    ABSTRACT

To provide a negative electrode for a non-aqueous electrolyte secondary battery that can be produced even without performing a heat treatment at a high temperature such as 2,000° C. or higher and can have the discharge capacity and the cycle characteristics (capacity retention) further increased.

The negative electrode for a non-aqueous electrolyte secondary battery according to the invention has a configuration in which a negative electrode active material layer containing a negative electrode material and a binder is formed on the surface of a current collector. Further, the negative (Continued)

electrode material has a core portion including carbonaceous negative electrode active material particles; and a shell portion including a polyimide and silicon-based negative electrode active material particles and/or tin-based negative electrode active material particles. Here, there is a feature that the content of the silicon-based negative electrode active material particles and/or tin-based negative electrode active material particles with respect to 100% by mass of the content of the carbonaceous negative electrode active material particles is 2% to 20% by mass. Furthermore, there is a feature that the binder is formed of a hydrophilic unit and a hydrophobic unit bonded together.

10 Claims, 2 Drawing Sheets

(51) Int. Cl.
  *H01M 4/587* (2010.01)
  *H01M 4/38* (2006.01)
  *H01M 4/36* (2006.01)
  *H01M 4/134* (2010.01)
  *H01M 10/0525* (2010.01)
  *H01M 4/02* (2006.01)

(52) U.S. Cl.
  CPC .......... *H01M 4/387* (2013.01); *H01M 4/587* (2013.01); *H01M 4/622* (2013.01); *H01M 10/0525* (2013.01); *H01M 2004/021* (2013.01); *H01M 2004/027* (2013.01)

(58) Field of Classification Search
  CPC ............ H01M 10/0525; H01M 4/387; H01M 2004/021; H01M 2004/027; H01M 4/625; H01M 4/1395; H01M 4/1393; Y02E 60/10
  See application file for complete search history.

(56) References Cited

U.S. PATENT DOCUMENTS

| | | |
|---|---|---|
| 2006/0099506 A1 | 5/2006 | Krause et al. |
| 2007/0099081 A1 | 5/2007 | Matsuda et al. |
| 2009/0297945 A1* | 12/2009 | Hwang .................. H01M 4/56 |
| | | 429/207 |
| 2010/0009258 A1 | 1/2010 | Hasegawa et al. |
| 2010/0136432 A1 | 6/2010 | Kim |
| 2010/0178571 A1 | 7/2010 | Nanba et al. |
| 2012/0168688 A1 | 7/2012 | Nakayama |
| 2014/0017570 A1 | 1/2014 | Naoi et al. |
| 2014/0054496 A1 | 2/2014 | Hanasaki et al. |
| 2014/0065489 A1 | 3/2014 | Saimen et al. |
| 2015/0243993 A1* | 8/2015 | Kang .................... C08F 220/48 |
| | | 526/307.7 |
| 2016/0218399 A1* | 7/2016 | Mizuta .............. H01M 10/0568 |
| 2018/0108912 A1* | 4/2018 | Kang .................... H01M 4/133 |
| 2018/0254476 A1 | 9/2018 | Fujiwara |

FOREIGN PATENT DOCUMENTS

| | | |
|---|---|---|
| JP | 2004-182512 A | 7/2004 |
| JP | 2012-099341 A | 5/2012 |
| JP | 2012-252845 A | 12/2012 |
| JP | 2013-225502 A | 10/2013 |
| JP | 2013-239356 A | 11/2013 |
| JP | 2014-044895 A | 3/2014 |
| JP | 2014-212133 A | 11/2014 |
| JP | 2015-164127 A | 9/2015 |
| JP | 2016-100225 A | 5/2016 |
| JP | 2016-143462 A | 8/2016 |
| JP | 2016-192272 A | 11/2016 |
| KR | 10-2014-0008982 A | 1/2014 |
| WO | 2004-200010 A | 4/2004 |
| WO | WO-2012/133844 A1 | 10/2012 |
| WO | WO-2013/132864 A1 | 9/2013 |
| WO | WO 2016/136543 A1 | 9/2016 |
| WO | WO 2016-204530 * 12/2016 .......... H01M 10/052 |

* cited by examiner

NEGATIVE ELECTRODE FOR NON-AQUEOUS ELECTROLYTE SECONDARY BATTERY AND NON-AQUEOUS ELECTROLYTE SECONDARY BATTERY USING THE SAME

TECHNICAL FIELD

The present invention relates to a negative electrode for a non-aqueous electrolyte secondary battery and a non-aqueous electrolyte secondary battery using the same.

BACKGROUND ART

In recent years, in order to cope with air pollution and global warming, reduction in carbon dioxide emission is strongly desired. In the automotive industry, there are growing expectations for a reduction in carbon dioxide emissions brought by introduction of electric vehicles (EV) or hybrid electric vehicles (HEV), and development of non-aqueous electrolyte secondary batteries such as secondary batteries for motor driving, which hold the key to the practical application of these vehicles, is being actively carried out.

As a secondary battery for motor driving, the battery is required to have extremely high output characteristics and high energy as compared to lithium ion secondary batteries for consumer use, which are used for mobile telephones, notebook computers, and the like. Therefore, lithium ion secondary batteries having the highest theoretical energy among all practical batteries have attracted attention, and thus, development thereof is currently in rapid progress.

A lithium ion secondary battery is generally configured such that a positive electrode obtained by applying a positive electrode active material or the like on both surfaces of a positive electrode current collector using a binder, and a negative electrode obtained by applying a negative electrode active material or the like on both surfaces of a negative electrode current collector using a binder, are connected by means of an electrolyte layer and are accommodated in a battery case.

Conventionally, for the negative electrodes of lithium ion secondary batteries, carbon/graphite-based materials that are advantageous in terms of the charge-discharge cycle lifetime and cost have been used. However, in a carbon/graphite-based negative electrode material, since charging and discharging is achieved by intercalation and deintercalation of lithium ions in graphite crystals, there is a defect that a charge and discharge capacity higher than or equal to 372 mAh/g, which is the theoretical capacity obtainable from the maximum lithium intercalation compound $LiC_6$, cannot be obtained. Therefore, it is difficult to obtain a capacity and an energy density that satisfy a level for practical application in the use of vehicles having a cruising distance equivalent to that of gasoline vehicles, with a carbon/graphite-based negative electrode material.

In contrast, batteries having a material capable of alloying with Li used for the negative electrode exhibit increased energy densities compared to conventional carbon/graphite-based negative electrode materials, and therefore, such a material is expected as a negative electrode material for vehicle uses. For example, a Si material intercalates and deintercalates 3.75 mol of lithium ions per 1 mol as shown in the following Reaction Scheme (A) during charging and discharging, and the theoretical capacity of $Li_{15}Si_4$ (=$Li_{3.75}Si$) is 3,600 mAh/g.

[Chem. 1]

However, a lithium ion secondary battery that uses a material capable of alloying with Li for the negative electrode undergoes large expansion and contraction in the negative electrode during charging and discharging. For example, the volume expansion in the case of intercalating Li ions is about 1.2 times in a graphite material, while in the Si material, when Si and Li are alloyed, an amorphous state is converted to a crystalline state, and a large volume change (about 4 times) occurs. Therefore, there is a problem that the cycle lifetime of the electrode is reduced. Furthermore, in the case of a Si negative electrode active material, the capacity and the cycle durability are in a trade-off relationship, and there is a problem that it is difficult to enhance the cycle durability while exhibiting high capacity.

Here, in JP 2004-182512 A (corresponding to US Patent Application Publication No. 2006/035149), an invention intended to provide a non-aqueous electrolyte secondary battery having a large discharge capacity and having excellent cycle characteristics and large current load characteristics (rate characteristics) is disclosed. Specifically, a technique of mixing carbon particles in which a carbonaceous material containing Si and/or a Si compound is adhering to the surface of carbon particles having a graphite structure, with fibrous carbon and using the mixture as a negative electrode material, or using carbon particles in which a carbonaceous material containing Si and/or a Si compound and fibrous carbon is adhering to the surface of carbon particles having a graphite structure, as a negative electrode material, is disclosed. At this time, it is considered that a product obtainable by heat-treating a composition including a polymer is used as the carbonaceous material.

SUMMARY OF INVENTION

Technical Problem

However, even with the technique described in JP 2004-182512 A, the effect of increasing the discharge capacity, and cycle lifetime is still insufficient, and there is still room for improvement. Furthermore, in the technique described in JP 2004-182512 A, since it is necessary to perform a heat treatment at a high temperature of 2,000° C. or higher, special manufacturing apparatuses are needed. Therefore, it is not preferable even from the viewpoints of production cost and productivity.

Thus, an object of the present invention is to provide a negative electrode for a non-aqueous electrolyte secondary battery that can be produced without performing a heat treatment at a high temperature such as 2,000° C. or higher and can further increase the discharge capacity and cycle lifetime (capacity retention rate).

Solution to Problem

The inventors of the present invention conducted a thorough investigation in order to solve the problem described above. During the operation, the inventors attempted to use a negative electrode material that is configured to have a core portion containing carbonaceous negative electrode active material particles and a shell portion containing a polyimide and silicon-based negative electrode active material particles and/or tin-based negative electrode active material particles. Then, the inventors found that the problem can be solved by appropriately controlling the proportions of the contents of the respective negative electrode active material particles and using a binder formed of a hydrophilic unit and a hydrophobic unit bonded together.

That is, the negative electrode for a non-aqueous electrolyte secondary battery according to the present invention has a configuration in which a negative electrode active material layer containing a negative electrode material and a binder is formed on the surface of a current collector. Further, the negative electrode material has a core portion containing carbonaceous negative electrode active material particles; and a shell portion containing a polyimide and silicon-based negative electrode active material particles and/or tin-based negative electrode active material particles. Here, there is a feature that the content of the silicon-based negative electrode active material particles and/or tin-based negative electrode active material particles with respect to 100% by mass of the content of the carbonaceous negative electrode active material particles is 2% to 20% by mass. Furthermore, there is a feature that the binder is formed of a hydrophilic unit and a hydrophobic unit bonded together.

DESCRIPTION OF EMBODIMENTS

Figure 1:
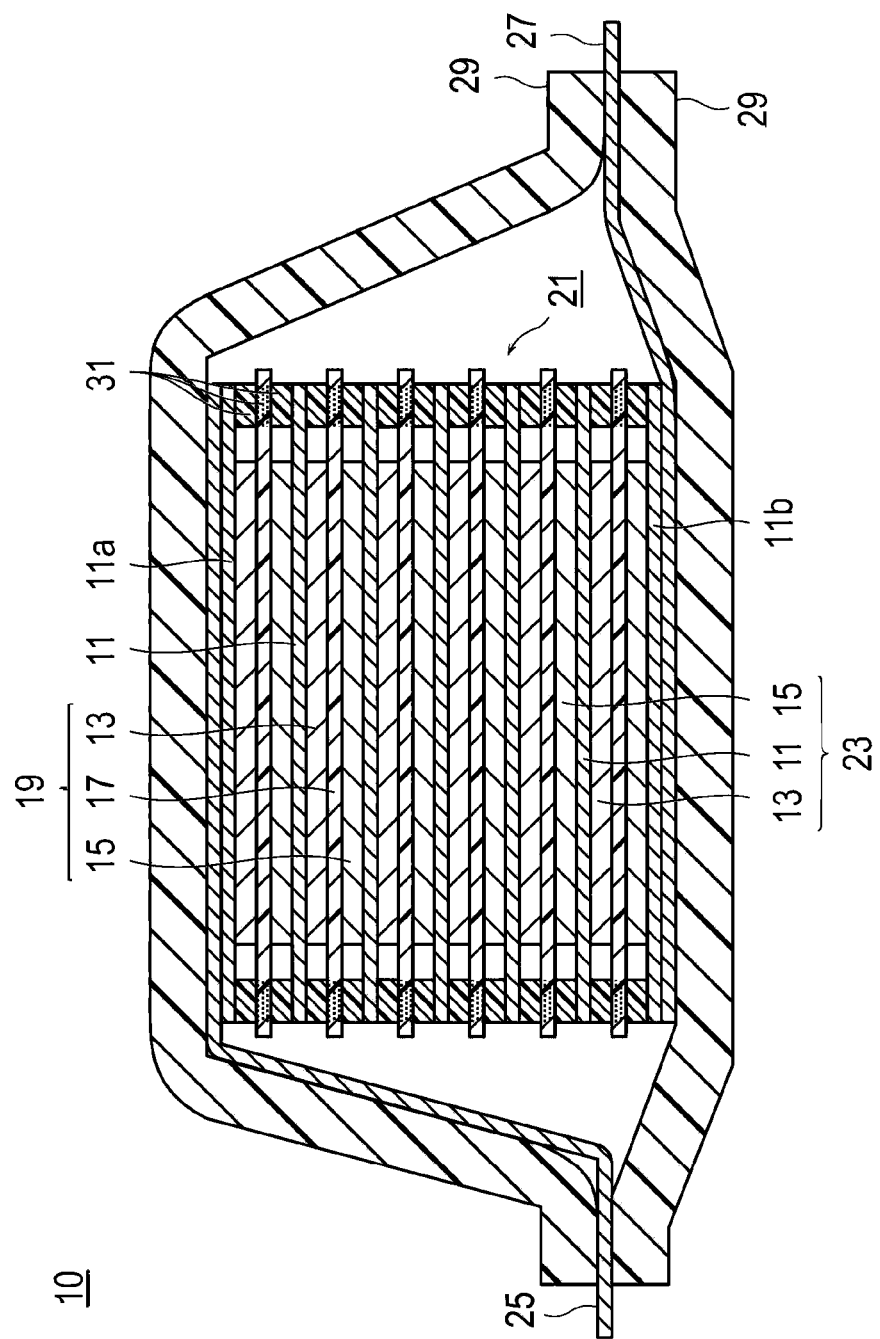
FIG. 1 is a cross-sectional view schematically illustrating a bipolar secondary battery according to one embodiment of the present invention.

In the following description, embodiments of the negative electrode material according to the present invention as described above will be explained with reference to the drawings; however, the technical scope of the present invention should be defined based on the description of the claims and is not intended to be limited only to the following embodiments. In the following description, the present invention will be explained by taking a bipolar lithium ion secondary battery, which is an embodiment of a non-aqueous electrolyte secondary battery, as an example. Meanwhile, the dimensional ratios of the drawings are exaggerated for the convenience of explanation and may be different from the actual ratios. Furthermore, in the present specification, a bipolar lithium ion secondary battery may be simply referred to as "bipolar secondary battery", and a bipolar lithium ion secondary battery electrode may be simply referred to as "bipolar electrode".

The negative electrode for a non-aqueous electrolyte secondary battery according to the present invention has a configuration in which a negative electrode active material layer containing a negative electrode material and a binder is formed on the surface of a current collector. Further, the negative electrode material has a core portion containing carbonaceous negative electrode active material particles; and a shell portion containing a polyimide and silicon-based negative electrode active material particles and/or tin-based negative electrode active material particles. Here, there is a feature that the content of the silicon-based negative electrode active material particles and/or tin-based negative electrode active material particles with respect to 100% by mass of the content of the carbonaceous negative electrode active material particles is 2% to 20% by mass. Furthermore, there is a feature that the binder is formed of a hydrophilic unit and a hydrophobic unit bonded together. When the negative electrode for a non-aqueous electrolyte secondary battery according to the present invention is used, it is possible to obtain an effect of increasing the discharge capacity while suppressing to a minimal level the influence of the volume change of the silicon-based negative electrode active material particles and/or tin-based negative electrode active material particles at the time of charging and discharging. Furthermore, the polyimide of the shell portion becomes capable of transmitting electrons and ions by being reduced, and contributes to the maintenance of a conductive network. As a result, the polyimide can contribute to a reduction of the amount of a conductive aid that is included in the negative electrode active material layer and to an increase in the content of the material that can function as an active material, and can further bring about a significant increase in the discharge capacity. The negative electrode material according to the present invention can be produced even without performing a heat treatment at a high temperature such as 2,000° C. or higher. Furthermore, the hydrophilic unit (particularly, a carboxyl group) of the binder interacts with the silicon-based negative electrode active material particles and/or tin-based negative electrode active material particles in the negative electrode material, and the hydrophobic unit interacts with the carbonaceous negative electrode active material particles in the negative electrode material. Thereby, the binder can sufficiently bind the negative electrode material in the negative electrode active material layer, and therefore, the non-aqueous electrolyte secondary battery negative electrode can contribute to an enhancement of cycle characteristics.

<Bipolar Secondary Battery>

FIG. 1 is a cross-sectional view schematically illustrating a bipolar secondary battery as an embodiment of the present invention. The bipolar secondary battery 10 illustrated in FIG. 1 has a structure in which an approximately rectangular-shaped power generating element 21, in which a charging and discharging reaction actually proceeds, is encapsulated inside a laminate film 29 as a battery outer casing body.

As shown in FIG. 1, the power generating element 21 of the bipolar secondary battery 10 of the present embodiment has a plurality of bipolar electrodes 23, in which a positive electrode active material layer 13 is formed on one surface of a current collector 11 to be electrically coupled thereto, and a negative electrode active material layer 15 is formed on the opposite surface of the current collector 11 to be electrically coupled thereto. The respective bipolar electrodes 23 are stacked, with an electrolyte layer 17 being interposed therebetween, and form the power generating element 21. Meanwhile, the electrolyte layer 17 has a configuration in which an electrolyte is retained at the central portion in the plane direction of a separator. At this time, the respective bipolar electrodes 23 and electrolyte layers 17 are alternately stacked such that the positive electrode active material layer 13 of one bipolar electrode 23 and the negative electrode active material layer 15 of another bipolar electrode 23 adjacent to the one bipolar electrode 23 face each other, with the electrolyte layer 17 being interposed therebetween. That is, the electrolyte layer 17 is interposed between the positive electrode active material layer 13 of one bipolar electrode 23 and the negative electrode active material layer 15 of another bipolar electrode 23 adjacent to the one bipolar electrode 23. However, the technical scope of the present invention is not limited to the bipolar secondary battery illustrated in FIG. 1, and for example, a battery having a consequently similar series connection structure formed by a plurality of single battery layers being stacked electrically in series as disclosed in WO 2016/031688 may be also acceptable.

Although not shown in the figure, with regard to the bipolar secondary battery 10 of FIG. 1, the negative electrode active material layer 15 can function as a negative electrode of a secondary battery by including a negative electrode material according to an embodiment of the present invention as described above (a core-shell type negative electrode material having a core portion formed from hard carbon and a shell portion formed from SiO particles, a polyimide, and acetylene black). Furthermore, the negative electrode active material layer 15 contains a copolymer of polyacrylic acid and butadiene rubber as a binder, and acetylene black as a conductive aid.

A positive electrode active material layer 13, an electrolyte layer 17, and a negative electrode active material layer 15 that are adjacent to each other constitute one single battery layer 19. Therefore, it can be said that a bipolar secondary battery 10 has a configuration in which single battery layers 19 are stacked. Furthermore, on the outer periphery of the single battery layer 19, a seal part (insulating layer) 31 is disposed. Thereby, liquid junction caused by leakage of an electrolyte solution from the electrolyte layer 17 is prevented, and the occurrence of short circuits attributed to the contact between adjoining current collectors 11 within the battery, to the slight unevenness of the edges of the single battery layer 19 in a power generating element 21, or the like, is prevented. Meanwhile, in the outermost layer current collector 11*a* on the positive electrode side positioned at the outermost layer of the power generating element 21, the positive electrode active material layer 13 is formed on only one surface. Furthermore, in the outermost layer current collector 11*b* on the negative electrode side positioned at the outermost layer of the power generating element 21, the negative electrode active material layer 15 is formed on only one surface.

Furthermore, in the bipolar secondary battery 10 illustrated in FIG. 1, a positive electrode current collecting plate (positive electrode tab) 25 is disposed so as to be adjacent to the outermost layer current collector 11*a* on the positive electrode side, and this is extended and led out from the laminate film 29, which is the battery outer casing body. On the other hand, a negative electrode current collecting plate (negative electrode tab) 27 is disposed so as to be adjacent to the outermost layer current collector lib on the negative electrode side, and similarly, this is extended and led out from the laminate film 29.

Meanwhile, the number of laminations of the single battery layer 19 is regulated according to the desired voltage. Furthermore, in the bipolar secondary battery 10, the number of laminations of the single battery layer 19 may be reduced as long as sufficient output power can be secured even if the thickness of the battery is made as thin as possible. In the bipolar secondary battery 10, in order to prevent any external impact at the time of use and environmental deterioration, it is also desirable to employ a structure in which the power generating element 21 is encapsulated under reduced pressure with a laminate film 29, which is a battery outer casing body, and the positive electrode current collecting plate 25 and the negative electrode current collecting plate 27 are taken out of the laminate film 29.

Meanwhile, here, embodiments of the present invention have been described by taking a bipolar secondary battery as an example; however, the type of the non-aqueous electrolyte battery to which the present invention is applicable is not particularly limited, and the present invention can be applied to any conventionally known non-aqueous electrolyte secondary battery such as a so-called parallel laminate type battery of the type in which single battery layers are connected in parallel in the power generating element.

Hereinafter, main constituent elements of the above-described bipolar secondary battery will be explained.

[Current Collector]

A current collector has a function of mediating electron movement from one surface that is in contact with a positive electrode active material layer to the other surface that is in contact with a negative electrode active material layer. The material for forming a current collector is not particularly limited; however, for example, a metal or a resin having electrical conductivity can be employed.

Specifically, examples of the metal include aluminum, nickel, iron, stainless steel, titanium, copper, and the like. In addition to these, a clad material of nickel and aluminum, a clad material of copper and aluminum, a plated material of a combination of these metals, or the like can be preferably used. Furthermore, the metal may also be a foil obtained by coating aluminum on a metal surface. Above all, from the viewpoints of electron conductivity, battery operation potential, the adhesiveness of the negative electrode active material to the current collector by sputtering, and the like, aluminum, stainless steel, copper, and nickel are preferred.

As the latter resin having electrical conductivity, a resin obtained by adding a conductive filler as necessary to a non-conductive polymer material may be mentioned.

Examples of the non-conductive polymer material include polyethylenes (PE; high-density polyethylene (HDPE), low-density polyethylene (LDPE), and the like), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethyl acrylate (PMA), polymethylmethacrylate (PMMA), polyvinyl chloride (PVC), polyvinylidene fluoride (PVdF), polystyrene (PS), and the like. Such a non-conductive polymer material can have excellent electric potential resistance or solvent resistance.

In the conductive polymer material or non-conductive polymer material described above, a conductive filler may be added as necessary. Particularly, in a case in which the resin that serves as a base material of the current collector is formed only from a non-conductive polymer, a conductive filler becomes necessarily essential in order to impart electrical conductivity to the resin.

Regarding the conductive filler, any material having electrical conductivity can be used without any particular limitations. For example, as a material having excellent conductivity, electric potential resistance, or lithium ion blocking properties, a metal, conductive carbon, and the like may be mentioned. The metal is not particularly limited; however, it is preferable to include at least one metal selected from the group consisting of Ni, Ti, Al, Cu, Pt, Fe, Cr, Sn, Zn, In, and Sb, or an alloy or metal oxide including these metals. Furthermore, the conductive carbon is not particularly limited. Preferably, at least one selected from the group consisting of acetylene black, VULCAN (registered trademark), BLACK PEARL (registered trademark), carbon nanofibers, KETJEN BLACK (registered trademark), carbon nanotubes, carbon nanohorns, carbon nanoballoons, and fullerene is included.

The amount of addition of the conductive filler is not particularly limited as long as it is an amount capable of imparting sufficient conductivity to the current collector, and generally, the amount of addition is about 5% to 35% by mass with respect to 100% by mass of the total mass of the current collector.

Meanwhile, the current collector may have a single-layer structure formed from a single material, or may have a laminated structure obtained by combining layers formed from these materials as appropriate. From the viewpoint of weight reduction of the current collector, it is preferable to include at least a conductive resin layer formed from a resin having electrical conductivity. Furthermore, from the viewpoint of blocking the movement of lithium ions between single battery layers, a metal layer may be provided in a portion of the current collector.

[Negative Electrode Active Material Layer]

The negative electrode active material layer contains the negative electrode material according to the present invention. The negative electrode material according to the present invention has a core portion containing carbonaceous negative electrode active material particles; and a shell portion containing a polyimide and silicon-based negative electrode active material particles and/or tin-based negative electrode active material particles, and adhering to at least a portion of the surface of the core portion or covering at least a portion of the surface of the core portion. In the present specification, the negative electrode material according to the present invention is also simply referred to as "core-shell type negative electrode material".

The core-shell type negative electrode material is composed of a core portion containing carbonaceous negative electrode active material particles, which is a first negative electrode active material; and a shell portion adhering to at least a portion of the surface of the core portion or covering at least a portion of the surface of the core portion. This shell portion contains a polyimide and silicon-based negative electrode active material particles and/or tin-based negative electrode active material particles as a second negative electrode active material. Meanwhile, the entire surface of the core portion may be covered with the shell portion, or a part of the surface of the core portion may be covered. According to a preferred embodiment, the proportion of the surface of the core portion adhered or covered by the shell portion is preferably 10% by area or more, more preferably 30% by area or more, even more preferably 50% by area or more, still more preferably 60% by area or more, even more preferably 70% by area or more, particularly preferably 80% by area or more, and most preferably 90% by area or more.

Meanwhile, in the surface of the carbonaceous negative electrode active material particles as the core portion, the proportion of the part covered with the shell portion containing a polyimide can be identified by a method of performing an observation of a secondary electron image produced by scanning electron microscopy of a sample obtained by staining the polyimide contained in the shell portion with an aqueous solution of silver nitrate, and determining the area proportion of the covered part with respect to the entirety from the contrast of the image obtained using an image analysis software program, or the like.

(Core Portion)

In the core-shell type negative electrode material, the core portion contains carbonaceous negative electrode active material particles. Examples of the carbonaceous negative electrode active material particles include particles formed from carbonaceous materials such as graphite, soft carbon (easily graphitizable carbon), and hard carbon (non-graphitizing carbon). Depending on cases, two or more kinds of carbonaceous negative electrode active material particles may be used in combination. It is preferable that the carbonaceous negative electrode active material particles contain hard carbon. As the carbonaceous negative electrode active material particles contain hard carbon, propylene carbonate, which is a solvent for liquid electrolyte having excellent low temperature characteristics, can be suitably used, and this is important also from the viewpoint of solvent barrier properties of a resin current collector in a battery that uses a resin current collector as will be described below. Furthermore, there is also an advantage that detection of the state of charge is made easy even in a stage in which the state of charge (charging rate; SOC) is low due to the use of hard carbon. Meanwhile, it is definitely acceptable that carbonaceous negative electrode active material particles other than those described above may be used.

The volume average particle size (D50) of the carbonaceous negative electrode active material particles that constitute the core portion is not particularly limited; however, from the viewpoint of output increase, the volume average particle size is preferably 1 to 100 µm, and more preferably 5 to 30 µm. Meanwhile, the value of the "volume average particle size (D50) of the active material particles" in the present specification means the value of 50% diameter in the volume-based integrated fractions that can be determined by a laser diffraction measurement method.

(Shell Portion)

In regard to the core-shell type negative electrode material, as described above, the shell portion contains a polyimide as a base material and silicon-based negative electrode active material particles and/or tin-based negative electrode active material particles. The thickness of the shell portion having such a configuration is not particularly limited; however, the thickness is preferably 0.01 to 5 µm, and more preferably 0.1 to 2 µm.

Regarding the silicon-based negative electrode active material particles and/or tin-based negative electrode active material particles, conventionally known negative electrode active material particles containing silicon and/or tin can be suitably used. Here, it is known that silicon and tin belong to the elements of Group 14 and are negative electrode active materials capable of largely increasing the capacity of a non-aqueous electrolyte secondary battery. Since simple substances of these are capable of intercalating and deintercalating a large number of charge carriers (lithium ions and the like) per unit volume (mass), the substances become negative electrode active materials of high capacity. However, on the other hand, non-aqueous electrolyte secondary batteries that use these as negative electrode active materials may have relatively poor rate characteristics. In contrast, non-aqueous electrolyte secondary batteries that use carbonaceous negative electrode active materials have excellent rate characteristics. Therefore, by configuring a negative electrode material using the two substances as negative electrode active materials in combination, the non-aqueous electrolyte secondary battery can be made to have high capacity, and excellent rate characteristics can be imparted to the non-aqueous electrolyte secondary battery.

Silicon has a large theoretical capacity in the case of being used as a negative electrode active material, but undergoes a large volume change during charging and discharging. However, for a core-shell type negative electrode material, it has been devised to reduce the influence of the volume change in the active material during charging and discharging. Therefore, as the negative electrode active material containing silicon element (silicon-based negative electrode active material), it is preferable to use the simple substance of Si. Similarly, it is also preferable to use a silicon oxide such as SiO. ($0.3 \leq x \leq 1.6$) that is disproportionate between two phases of a Si phase and a silicon oxide phase. The Si phase in $SiO_x$ can intercalate and deintercalate lithium ions. This Si phase causes volume changes (that is, expansion and contraction) along with intercalation and deintercalation of lithium ions. On the other hand, the silicon oxide phase is composed of $SiO_2$ and the like, and the volume change associated with charging and discharging is small compared to the Si phase. That is, $SiO_x$ as the negative electrode active material realizes high capacity by the Si phase and also suppresses volume change of the entirety of the negative electrode active material (or negative electrode) by having a silicon oxide phase. Meanwhile, when x is 0.3 or greater, the ratio of Si does not become excessively large, the volume change at the time of charging and discharging can be sufficiently suppressed, and the cycle characteristics can be maintained satisfactory. On the other hand, when x is 1.6 or less, the ratio of Si does not become excessively small, and the energy density can be maintained at a sufficiently high value. The range of x is more preferably such that $0.5 \leq x \leq 1.5$, and even more preferably $0.7 \leq x \leq 1.2$. Meanwhile, with regard to the $SiO_x$ negative electrode active material, it is considered that an alloying reaction between lithium element and the silicon element Included in the Si phase occurs during charging and discharging of a non-aqueous electrolyte secondary battery, and this alloying reaction contributes to the charging and discharging of the non-aqueous electrolyte secondary battery (lithium ion secondary battery). Furthermore, similarly for the negative electrode active material containing tin element (tin-based negative electrode active material) that will be described below, it is considered that charging and discharging proceed as a result of an alloying reaction between tin element and lithium element. Furthermore, it is also preferable to use various kinds of silicon-containing alloys from the viewpoints of capacity characteristics and cycle durability.

Examples of the negative electrode active material containing tin element (tin-based negative electrode active material) include simple substance of Sn, tin alloys (Cu—Sn alloy, Co—Sn alloy), amorphous tin oxides, tin silicon oxides, and the like. Among these, an example of the amorphous tin oxides is $SnBo_{0.4}P_{0.6}O_{3.1}$. Furthermore, an example of the tin silicon oxide is $SnSiO_3$.

The average particle size of the silicon-based negative electrode active material particles and/or tin-based active material particles included in the shell portion is not particularly limited. However, with regard to the core-shell type negative electrode material, it is preferable that the volume average particle size (D50) of the silicon-based negative electrode active material particles and/or tin-based active material particles is sufficiently small compared to the carbonaceous negative electrode active material particles. Specifically, the value of the ratio of the volume average particle size (D50) of the silicon-based negative electrode active material particles and/or tin-based negative electrode active material particles with respect to the volume average particle size (D50) of the carbonaceous negative electrode active material particles is preferably 0.001 to 0.1, and more preferably 0.005 to 0.05. When the value of this ratio is within this range, it is possible to show an effect of increasing the discharge capacity. Meanwhile, the value of the volume average particle size (D50) of the silicon-based negative electrode active material particles and/or tin-based active material particles is, from the viewpoint of increasing the output power and suppressing the volume change, preferably 0.05 to 2 μm, and more preferably 0.1 to 1 μm. Here, in a case in which the silicon-based negative electrode active material particles and tin-based negative electrode active material particles are included together, the ratio should be calculated using the volume average particle size (D50) of all of these active material particles.

Another feature of the shell portion lies in the ratio between the content of the silicon-based negative electrode active material particles and/or tin-based active material particles included in the shell portion and the content of the carbonaceous negative electrode active material particles included in the core portion. That is, it is essential that the content of the silicon-based negative electrode active material particles and/or tin-based negative electrode active material particles with respect to 100% by mass of the content of the carbonaceous negative electrode active material particles is 2% to 20% by mass, and preferably 3% to 10% by mass. When the proportion of the content of the silicon-based negative electrode active material particles and/or tin-based negative electrode active material particles is below this range, there is a risk that an effect of increasing the discharge capacity may not be sufficiently obtained. On the other hand, when the proportion of the content of the silicon-based negative electrode active material particles and/or the tin-based negative electrode active material particles is above this range, there is a risk that the cycle durability of the battery may deteriorate. Meanwhile, in a case in which the silicon-based negative electrode active material particles and the tin-based negative electrode active material particles are included together, it is necessary that the total content of these is 2% to 20% by mass. Furthermore, the content of the silicon-based negative electrode active material particles and/or tin-based active material particles included in the shell portion is preferably 50% to 110% by mass, and more preferably 70% to 90% by mass, with respect to 100% by mass of the content of the base material component of the shell portion that will be described below.

The constituent materials of the base material included in the shell portion include a polyimide. There are no particular limitations on the specific form of the polyimide that constitutes the base material, and conventionally known information can be referred to as appropriate. A polyimide is a polymer compound having imide bonds in the repeating units; then, since a highly polar imide bond is a bond having excellent heat resistance, a non-aqueous electrolyte secondary battery negative electrode material having an excellent discharge capacity can be provided, without performing a heat treatment at a high temperature such as 2,000° C. or higher, by using a base material containing a polyimide in the shell portion. Furthermore, the base material of the shell portion may include a conventionally known binder in addition to a polyimide; however, preferably, from the viewpoint of achieving a superior discharge capacity, it is preferable that the proportion occupied by the polyimide in the base material components for the shell portion is 50% by mass or more, more preferably 70% by mass or more, even more preferably 80% by mass or more, still more preferably 90% by mass or more, particularly preferably 95% by mass or more, and most preferably 100% by mass.

Regarding the polyimide, various polyimides classified by the differences in the type of monomers or average molecular weight (for example, number average molecular weight)

may be mentioned; however, the polyimides can be used without any particular limitations. Specific examples of the polyimide include the known polyamides described in Journal of the Japan Institute of Electronics Packaging, Vol. 4, No. 7 (2001), p. 640-646, and the like. Above all, preferably, from the viewpoint of satisfactory electron mobility, a polyimide having an aromatic ring in the molecular chain (that is, an aromatic polyimide) is preferably used. Meanwhile, regarding the polyimide, only one kind may be used alone, or two or more kinds thereof may be used in combination.

The glass transition point of the polyimide is not particularly limited; however, from the viewpoint of heat resistance of the resin after curing, the glass transition point is preferably 250° C. to 500° C.

Meanwhile, regarding the method of forming the shell portion around the core portion, a method of covering the surface of the core portion using a mixture of a polyimide as a base material for the shell portion and other constituent elements of the shell portion may be mentioned. However, it is preferable to form a desired shell portion by covering the surface of the core portion using a mixture of a precursor of a polyimide and other constituent components of the shell portion and the converting the precursor into the polyimide, by referring as appropriate to conventionally known information on the method for synthesizing a polyimide. Examples of such a precursor of polyimide include polyamic acid (also referred to as "polyamide acid"). Polyamic acid undergoes, when heat-treated, dehydration and condensation to form imide bonds, and becomes polyimide. Therefore, by coating the surface of carbonaceous negative electrode active material particles that constitute the core portion using a mixture (for example, slurry in N-methyl-2-pyrrolidone (NMP)) including a precursor of polyimide (polyamic acid or the like) instead of polyimide, together with silicon-based negative electrode active material particles and/or tin-based negative electrode active material particles, and then performing a heat treatment, the precursor can be converted to polyimide, and a negative electrode material can be obtained.

Meanwhile, there are no particular limitations on the molecular weight of the polyamic acid; however, the molecular weight as the weight average molecular weight measured by gel permeation chromatography (GPC) and calculated relative to polystyrene standards is preferably 500 to 5,000, and more preferably 1,000 to 4,000.

At this time, the imidization ratio of polyimide (mol % of polyimide produced with respect to the precursor) is not particularly limited, and the imidization ratio may be to the extent that a strong polymer matrix that can suitably absorb any volume change associated with expansion and contraction of the negative electrode active material in a charging and discharging reaction can be formed. For example, the imidization ratio is preferably 60% or higher, and more preferably 80% or higher. A polyimide having an imidization ratio of 80% or higher can be obtained by, for example, heat-treating an NMP solution of polyamic acid at a temperature of 100° C. to 400° C. for about one hour or longer. More specifically, for example, when the heat treatment is carried out at 350° C., the imidization ratio becomes about 80%, and with a heat treatment time of about 2 hours, the imidization ratio can become almost 100%.

Meanwhile, the polyamic acid that can be used as a precursor of polyimide can be obtained in the form of a solution by, for example, the following technique, and this solution may be used directly for the formation of the shell portion. That is, a polyamic acid solution can be obtained by reacting a diamine and a tetracarboxylic acid dianhydride in a solvent. The polyamic acid thus obtained may be of very low molecular weight and may not be necessarily in the form of polymer. An amic acid oligomer, a low-molecular weight amic acid compound obtainable by reacting one molecule of a diamine with one molecule or two molecules of a tetracarboxylic acid dianhydride, and a polyimide precursor including a component having an amic acid structure, which is obtainable from a raw material component such as a tetracarboxylic acid obtained by hydrolyzing a tetracarboxylic acid dianhydride, can also be used.

Regarding the diamine, any diamine that is used for polyimide can be used without limitations. An aromatic diamine that forms an aromatic polyimide is suitable, and examples include diamines having one benzene ring, such as m- or p-phenylenediamine, 2,4-diaminophenol, 3,5-diaminobenzoic acid, and 2,4-diaminotoluene; diamines having two benzene rings formed from a biphenyl structure, such as o-orthotolidine sulfone, 2,2'-dimethyl-4,4'-diaminobiphenyl, and 2,2'-bis(trifluoromethyl)-4,4'-diaminobiphenyl; diamines formed from two benzene rings having a structure in which benzene rings are bonded through a group such as —O—, —S—, —CO—, —SO$_2$—, —SO—, or —CH$_2$—, such as 4,4'-diaminodiphenyl ether, 4,4'-diaminodiphenyl thioether, 4,4'-diaminodiphenylmethane, 4,4'-diaminodiphenylsulfone, 4,4'-diaminobenzophenone, 5(6)-amino-1-(4-aminomethyl)-1,3,3-trimethylindane; and diamines having three or more benzene rings, such as 1,3-bis(3-aminophenoxy)benzene, 1,4-bis(4-aminophenoxy)benzene, 2,2-bis(4-aminophenoxyphenyl)propane, 2,2-bis[4-(4-aminophenoxy)phenyl]hexafluoropropane, and 9,9-bis(4-aminophenyl)fluorene. Furthermore, alicyclic diamines such as isophoronediamine and 1,4-diaminocyclohexane can also be suitably used.

Regarding the tetracarboxylic acid dianhydride, any tetracarboxylic acid dianhydride that is used for polyimide can be used without limitations. An aromatic tetracarboxylic acid dianhydride that forms an aromatic polyimide is suitable, and examples include 3,3',4,4'-biphenyltetracarboxylic acid dianhydride, 2,3,3',4-biphenyltetracarboxylic acid dianhydride, 2,2',3,3'-biphenyltetracarboxylic acid dianhydride, pyromellitic dianhydride, 3,3',4,4'-benzophenonetetracarboxylic acid dianhydride, oxydiphthalic dianhydride, 3,3',4, 4'-diphenylsulfonetetracarboxylic acid dianhydride, 2,3,6,7-naphthalenetetracarboxylic acid dianhydride, 1,4,5,8-naphthalenetetracarboxylic acid dianhydride, 4,4'-(2,2-hexafluoroisopropylidene)diphthalicdianhydride, and the like.

The solvent is a compound capable of dissolving polyamic acid, and an organic polar solvent having a boiling point of 300° C. or lower at normal pressure is preferred. Examples include solvents containing a nitrogen atom in the molecule, such as N,N-dimethylacetamide,N,N-diethylacetamide,N,N-dimethylformamide, N,N-diethylformamide, N-methyl-2-pyrrolidone (NMP), 1,3-dimethyl-2-imidazolidinone, and N-methylcaprolactam; for example, solvents containing a sulfur atom in the molecule, such as dimethyl sulfoxide, diethyl sulfoxide, dimethylsulfone, diethylsulfone, and hexamethylsulforamide; for example, solvents formed from a phenol, such as cresol, phenol, and xylenol; for example, solvents containing an oxygen atom in the molecule, such as diethylene glycol dimethyl ether (diglyme), triethylene glycol dimethyl ether (triglyme), and tetraglyme; as well as acetone, dimethylimidazoline, methanol, ethanol, ethylene glycol, dioxane, tetrahydrofuran, pyridine, tetramethylurea, and the like.

In a previous process of the method for producing a polyamic acid solution, it is preferable to produce a polyamic acid solution by reacting a diamine with a tetracarboxylic acid dianhydride in a molar amount that is excess with respect to the diamine, in a solvent including water in an amount of more than 1/3 times the molar amount of the tetracarboxylic acid dianhydride. Here, a polyamic acid having a molecular weight (low molecular weight) that is dependent on the molar ratio between the diamine and the tetracarboxylic acid dianhydride is mainly formed. Then, this polyamic acid generally has the tetracarboxylic acid dianhydride component disposed at the two ends, and between the tetracarboxylic acid dianhydride-derived anhydride groups disposed at the ends, the anhydride group that did not participate in the formation of an amic acid bond is hydrolyzed by water existing in the solvent and produces two carboxyl groups.

In the above-described previous process, it is suitable to use a solvent including water at a proportion of 0.05% to 2% by mass, and more preferably 0.05% to 1% by mass. In this previous process, a diamine reacts with a tetracarboxylic acid dianhydride in a molar amount that is in excess with respect to the amount of the diamine; however, the molar ratio of the molar amount of the tetracarboxylic acid dianhydride to the amount of the diamine (molar amount of tetracarboxylic acid dianhydride/molar amount of diamine) is preferably 1.2 or higher, more preferably 1.5 or higher, and usually about 1.5 to 5.0. In a case in which the molar ratio is 2 or higher, the tetracarboxylic acid dianhydride that did not react with the diamine in the polyamic acid solution after the reaction is hydrolyzed by water in the solvent, and is converted mainly to tetracarboxylic acid, which coexists in the system. However, as long as the tetracarboxylic acid is uniformly dissolved, there is no particular problem.

Furthermore, it is also possible to add the entire amount of the tetracarboxylic acid dianhydride that is used for producing the polyamic acid solution in the previous process to the solvent and cause the tetracarboxylic acid dianhydride to react so that the tetracarboxylic acid dianhydride is not further added in the subsequent processes; however, usually, the amount of the tetracarboxylic acid dianhydride caused to react in the previous process is preferably 10 mol % to 70 mol %, and more preferably 20 mol % to 50 mol %, with respect to the total amount of the tetracarboxylic acid dianhydride caused to react in the previous process and the subsequent process.

The reaction conditions for the previous process are not particularly limited as long as reaction conditions in which imidization is suppressed and polyamic acid is produced by an addition reaction are employed. It is suitable to perform at normal pressure; however, pressurized conditions or reduced pressure conditions are also acceptable. The temperature conditions are preferably 100° C. or lower, and more preferably a temperature range of 20° C. to 80° C., and usually in the previous process, reaction is carried out under the above-described temperature conditions for about 1 to 100 hours. Furthermore, the reaction can be suitably carried out in an atmosphere of an inert gas such as nitrogen gas.

In a subsequent process of the method for producing a polyamic acid solution, the diamine, or the diamine and the tetracarboxylic acid dianhydride are added to the polyamic acid solution obtained in the previous process such that the total amount of the diamine and the total amount of the tetracarboxylic acid dianhydride are substantially equimolar amounts, and preferably such that the molar ratio (tetracarboxylic acid dianhydride/diamine) is about 1.05 to 0.95, and the reaction is further carried out. This subsequent process can be suitably carried out under reaction conditions similar to the reaction conditions for the previous process described above. Meanwhile, regarding the tetracarboxylic acid dianhydride that is added in the subsequent process, a portion thereof may be substituted with a tetracarboxylic acid or a lower alcohol ester of a tetracarboxylic acid.

As a result of this subsequent process, an amic acid solution formed from an amic acid having a logarithmic viscosity of 0.4 or lower, preferably 0.01 to 0.4, more preferably 0.05 to 0.4, and particularly preferably 0.05 to 0.3, can be suitably obtained with high reproducibility. In this amic acid solution, substantially all (90% or more, and preferably 95% or more) of tetracarboxylic acid dianhydride-derived anhydride groups that have not formed amic acid bonds by reacting with amino groups, are hydrolyzed, and each anhydride group produces two carboxyl groups. Furthermore, since the amic acid is an amic acid having a very low molecular weight, an increase in the solution viscosity can be suppressed, and therefore, increase of the concentration is easily achieved. As a result, a highly concentrated polyamic acid solution having a solid content concentration of 25% by mass or more, preferably 25% to 50% by mass, more preferably 27% to 50% by mass, and particularly 30% to 45% by mass, can be suitably obtained.

Furthermore, for the synthesis of this polyamic acid solution, a solvent including water at a proportion of 0.05% to 2% by mass, and more preferably 0.05% to 1% by mass, is used in the previous process; however, this water is consumed in order to hydrolyze the anhydride group of the tetracarboxylic acid dianhydride, while the remaining portion remains in the solution. However, since originally only a small amount is used, it is not necessary to regulate (remove) particularly the amount of water after completion of the reaction. Even if water is not removed, for example, a polyamic acid solution having a water content of 1% by mass or less can be obtained. In addition to the fact that the amount of water in this amic acid solution is a sufficiently small amount as described above, tetracarboxylic acid dianhydride-derived anhydride groups other than the anhydride groups that have reacted with amino groups and formed amic acid bonds, are substantially nearly all hydrolyzed, and each anhydride group produces two carboxyl groups. Therefore, the possibility that the various components in this polyamic acid solution may cause any reaction at least during storage at low temperature is low, and as a result, the solution stability is very satisfactory.

As described above, the shell portion has a configuration in which silicon-based negative electrode active material particles and/or tin-based negative electrode active material particles are contained in a base material containing a polyimide. Here, the shell portion may further contain other components such as a conductive aid. The conductive aid included in the shell portion contributes to the formation of the electron conduction path and can contribute to an enhancement of electron conductivity between other components. Thereby, the carbonaceous negative electrode active material particles that constitute the core portion of the core-shell type negative electrode material, or the silicon-based negative electrode active material particles and/or tin-based negative electrode active material particles included in the shell portion can be electrically connected easily with the external side of the negative electrode material, and the conductivity inside the battery can be further increased. As a result, an increase in the internal resistance of the battery can be suppressed, and excellent effects such as enhancement of rate characteristics can be provided.

Examples of the conductive aid include metals such as aluminum, stainless steel (SUS), silver, gold, copper, and titanium; alloys or metal oxides including these metals; and carbons such as carbon fibers (specifically, vapor grown carbon fibers (VGCF), polyacrylonitrile-based carbon fibers, pitch-based carbon fibers, rayon-based carbon fibers, activated carbon fibers, and the like), carbon nanotubes (CNT), and carbon black (specifically, acetylene black, KETJEN BLACK (registered trademark), furnace black, channel black, thermal lamp black, and the like); however, the examples are not limited to these. Furthermore, a particulate ceramic material or resin material coated around with the above-described metal material by plating or the like can also be used as the conductive aid. Among these conductive aids, from the viewpoint of electrical stability, it is preferable to include at least one selected from the group consisting of aluminum, stainless steel, silver, gold, copper, titanium, and carbon; it is more preferable to include at least one selected from the group consisting of aluminum, stainless, silver, gold, and carbon; and it is even more preferable to include at least one of carbon. These conductive aids may be used singly, or two or more kinds thereof may be used in combination.

The shape of the conductive aid is preferably a particulate shape or a fibrous shape. In a case in which the conductive aid is in a particulate form, the shape of the particles is not particularly limited, and any shape such as a powdery form, a spherical shape, a rod shape, a needle shape, a plate shape, a pillar shape, an indeterminate shape, a scaly shape, or a spindle shape may be used.

The average particle size (primary particle size) in a case in which the conductive aid is in a particulate form is not particularly limited; however, from the viewpoint of the electrical characteristics of the battery, the average particle size is preferably about 0.01 to 10 μm. Meanwhile, in the present specification, the "particle size of the conductive aid" means the maximum distance L among the distances between any two points on the contour line of the conductive aid. Regarding the value of the "average particle size of the conductive aid", a value calculated as an average value of the particle sizes of particles that are observed in several to several dozen visual fields using an observation means such as a scanning electron microscope (SEM) or a transmission electron microscope (TEM), will be employed.

The content of the conductive aid in the shell portion is not particularly limited; however, the content is preferably 10% to 40% by mass, and more preferably 20% to 30% by mass, with respect to 100% by mass of the content of the base material component of the shell portion described above. When the content is in such a range, the conductive aid can satisfactorily form electron conduction paths n the shell portion.

The core-shell type negative electrode material (core-shell type negative electrode material) according to the present embodiment can be produced even without performing a heat treatment at a high temperature such as 2,000° C. or higher. Furthermore, by configuring a non-aqueous electrolyte secondary battery using this core-shell type negative electrode material, it is possible to further increase the discharge capacity.

Thus, a case in which the negative electrode active material layer includes a core-shell type negative electrode material has been explained in detail; however, the negative electrode active material layer may further include a material other than the core-shell type negative electrode material as the negative electrode active material. As the material that can function as a negative electrode active material other than the core-shell type negative electrode material according to the present invention, first, the above-mentioned carbonaceous negative electrode active material or the silicon-based negative electrode active material particles and/or tin-based negative electrode active material, all of which are not in the form of the core-shell type negative electrode material of the present invention, may be used directly. Furthermore, in addition to these materials, a lithium-transition metal composite oxide (for example, $Li_4Ti_5O_{12}$), a lithium alloy-based negative electrode material (for example, a lithium-tin alloy, a lithium-silicon alloy, a lithium-aluminum alloy, a lithium-aluminum-manganese alloy, or the like), and the like may be mentioned. Depending on cases, two or more kinds of these negative electrode active materials may be used in combination. Furthermore, it is also definitely acceptable to use a negative electrode active material other than those described above. Preferably, from the viewpoint of achieving a superior discharge capacity, it is preferable that the core-shell type negative electrode material according to the present invention is a main component (the proportion occupied in the active material component is 50% by mass or more), and with respect to 100% by mass of the active material components, more preferably 70% by mass or more, even more preferably 80% by mass or more, still more preferably 90% by mass or more, particularly preferably 95% by mass or more, and most preferably 100% by mass is the core-shell type negative electrode material according to the present invention.

(Binder)

Furthermore, the negative electrode active material layer contains the predetermined binder. The predetermined binder according to the present invention is formed of a hydrophilic unit and a hydrophobic unit bonded together. In the present specification, the predetermined binder according to the present invention may also be simply referred to as "amphoteric binder".

An amphoteric binder has a configuration in which a hydrophilic unit and a hydrophobic unit are bonded together, as described above. The amphoteric binder is preferably a polymer formed of a polymer (including an oligomer) comprising a hydrophilic constituent unit, and a polymer (including an oligomer) comprising a hydrophobic constituent unit, bonded together. There are no particular limitations on the "bonding", and any bonding can be used as long as it is a bonding by which a hydrophilic unit and a hydrophobic unit can be integrated and exist within the negative electrode active material layer without being separated, such as chemical bonding (covalent bonding, ionic bonding, coordination bonding, hydrogen bonding, or the like) and a topological structure. The "bonding" is preferably chemical bonding, and more preferably covalent bonding.

In a case in which a hydrophilic unit and a hydrophobic unit are chemically bonded, the amphoteric binder may be a block structure (preferably, a block polymer structure) in which a hydrophilic unit and a hydrophobic unit are linearly bonded, may be a branched structure (preferably, a graft polymer structure) in which one of the units is bonded by branching to a main chain comprising the other unit, or may be a physical crosslinked body in which a hydrophilic unit and a hydrophobic unit are bonded in a network form.

A hydrophilic unit is a unit formed from a component having solubility in water. Here, the solubility of the hydrophilic unit in water can be evaluated by various techniques. According to the present specification, for the determination of hydrophilicity/hydrophobicity of a certain unit, a component (homopolymer or the like) composed of this unit alone is added in small amounts into 100 g of water at pH 6 to 13 (for example, pH 7), while being stirred; the addition is stopped at a time point when clouding of water is recognized by visual inspection or light scattering measurement, and solubility of the unit in water is determined from the amount of addition at that time point. In this case, when 1 g of more is dissolved in 100 g of water at normal temperature (25° C.), this unit is considered as a hydrophilic unit. Meanwhile, as the water to be used for the checking of solubility, tap water, ion-exchanged water, ultrapure water, and the like can be used, and the pH of the water is adjusted by dissolving sodium hydroxide in water.

Examples of the hydrophilic unit include poly(meth) acrylic acid, carboxymethyl cellulose, polyvinyl alcohol, polyethylene oxide, and salts or derivatives of these polymers. The hydrophilic units described above may be used singly, or two or more kinds thereof may be used in combination. Furthermore, polyacrylic acid or polyvinyl alcohol may contain a constituent unit other than a constituent unit derived from acrylic acid or vinyl acetate, which are the original constituent units, to the extent that does not adversely affect the present invention (for example, as the constituent unit, preferably 30 mol % or less, more preferably 20 mol % or less, even more preferably 10 mol % or less, and particularly preferably 5 mol % or less). Among the hydrophilic units, from the viewpoint of having excellent solubility in water, being stable to organic solvents, and being available at low cost, poly(meth)acrylic acid and carboxymethyl cellulose are preferred; poly(meth)acrylic acid is particularly preferred; and polyacrylic acid is most preferred. Furthermore, when the hydrophilic unit is a unit having a carboxyl group, and when the surface of silicon-based negative electrode active material particles and/or tin-based negative electrode active material particles is exposed for some reason, the hydrophilic unit can interact strongly with the silanol group (—SiOH group) that is considered to exist on the surface of the particles, and it is also preferable from the viewpoint that the active material particles can be stabilized.

A hydrophobic unit is a unit formed from a component that is sparingly soluble or insoluble in water. The solubility of a hydrophobic unit in water is also evaluated by a dissolution test of a binder. In this case, when the solubility in 100 g of water at normal temperature (25° C.) is less than 1 g, the unit is considered as a hydrophobic unit.

Examples of the hydrophobic unit include a (hydrogenated) butadiene rubber, a (hydrogenated) isoprene rubber, a styrene-butadiene rubber, polyvinylidene fluoride, polytetrafluoroethylene, polyethylene, polypropylene, a methylene-propylene-diene terpolymer, a sulfonated ethylene-propylene rubber, and salts or derivatives of these polymers. The hydrophobic units mentioned above may be used singly, or two or more kinds thereof may be used in combination. Among the hydrophobic units, from the viewpoint of having excellent solubility in organic solvents and being stable to water, a (hydrogenated) butadiene rubber and a (hydrogenated) isoprene rubber are preferred, and a (hydrogenated) butadiene rubber is particularly preferred. Meanwhile, the description "(hydrogenated)" means that with regard to a butadiene rubber or an isoprene rubber, a double bond in a constituent unit may or may not be hydrogenated (hydrogen-added, or hydrogenated). Irrespective of the double bond being hydrogenated or not, there is no change in the fact that these compounds satisfy the definition of the hydrophobic unit and in the fact that these compounds function as hydrophobic units, and all of them can be preferably used. Furthermore, with regard to the hydrophobic unit, it is expected that the hydrophobic unit has compatibility with hard carbon particles (being capable of exhibiting the capacity without any problem) and has compatibility with expansion and contraction of silicon-based negative electrode active material particles and/or tin-based negative electrode active material particles caused by charging and discharging (exhibiting sufficient rubber elasticity). Furthermore, when the silicon-based negative electrode active material particles and/or tin-based active material particles start disintegrating due to expansion and contraction, and thus the active material component having high activity is brought into contact with other components and is thereby deteriorated, it is expected that the hydrophobic unit suppresses this.

Whether the binder has a configuration in which a hydrophilic unit and a hydrophobic unit are bonded together, that is, the binder is an amphoteric binder, can be verified by performing $^1$H-NMR analysis and $^{13}$C-NMR analysis of the binder, or the like, and specifying the bonding mode between the constituent units of the binder and the monomers that constitute the respective units. Furthermore, whether an identified constituent unit is a hydrophilic unit or a hydrophobic unit can be checked by synthesizing a polymer compound using the monomer specified by analysis and measuring the solubility in water by the above-described method.

There are no particular limitations on the method of obtaining an amphoteric binder, and in a case in which there are commercially available products, a commercially available product can be purchased and used. Furthermore, a product synthesized per se may also be used. The technique of synthesizing an amphoteric binder is not particularly limited, and conventionally known findings in the technical field of organic chemistry can be referred to as appropriate. As an example, a technique of synthesizing an amphoteric binder containing polyacrylic acid as a hydrophilic unit and a (hydrogenated) butadiene rubber as a hydrophobic unit in a chemically bonded state will be explained. In this case, first, a (hydrogenated) butadiene rubber or a (hydrogenated) isoprene rubber, in which the terminals (a single terminal or both terminals) have been modified by acrylic acid, which is a monomer constituting polyacrylic acid, and a radical-polymerizable functional group (for example, (meth)acrylic acid), is purchased. Next, this is radical-polymerized together with acrylic acid (and a polymerizable monomer other than that as necessary), thereby a polyacrylic acid component that constitutes a hydrophilic unit is synthesized, and thus an amphoteric binder can be obtained. Meanwhile, regarding the (hydrogenated) butadiene rubber or (hydrogenated) isoprene rubber that has been terminal-modified (hydrogenated) as described above, the following commercially available products are present. These may be used singly, or two or more kinds thereof may be used in combination. Furthermore, materials other than these may be definitely used.

Methacryl-Modified Isoprene Rubber

For example, trade name UC-102 manufactured by Kuraray Co., Ltd., number average molecular weight 17,000 (having two (meth)acryloyl groups in a side chain);

Hydrogenated Polybutadiene Diacrylate

For example, (i) trade name CN9014 manufactured by Sartomer USA, LLC (number average molecular weight 6,500, having a (meth)acryloyl group at both terminals, the main skeleton is hydrogenated), (ii) trade name TEAI-1000 manufactured by Nippon Soda Co., Ltd., number average molecular weight 2,000, having a (meth)acryloyl group at both terminals, the main skeleton is hydrogenated);

Acryl-Modified Butadiene Rubber

For example, trade name L-1253 manufactured by Kuraray Co., Ltd., number average molecular weight 7,000, having a (meth)acryloyl group at a single terminal;

Acryl-Modified Isoprene Rubber

For example, UC-203 manufactured by Kuraray Co., Ltd., number average molecular weight 27,000, having three (meth)acryloyl groups in a side chain, the main skeleton is non-hydrogenated.

The existence proportion between the hydrophilic unit and the hydrophobic unit in the amphoteric binder is not particularly limited and can be set as appropriate. However, from the viewpoint of further exhibiting the operating effect of the present invention, the mass proportion between the hydrophilic unit and the hydrophobic unit in the amphoteric binder is preferably 99:1 to 80:20, more preferably 98:2 to 85:15, and even more preferably 97:3 to 87:13.

Meanwhile, in a case in which the amphoteric binder is a polymer, there are no particular limitations on the molecular weight of the amphoteric binder; however, the number average molecular weight measured by gel permeation chromatography (GPC) and calculated relative to polyethylene glycol standards is preferably 10,000 to 100,000, more preferably 30,000 to 80,000, and even more preferably 40,000 to 70,000.

The content of the amphoteric binder in the negative electrode active material layer is not particularly limited; however, the content of the amphoteric binder is preferably 2% to 15% by mass, and more preferably 5% to 10% by mass, with respect to 100% by mass of the total solid content of the negative electrode active material layer (total solid content of all members). When the content of the amphoteric binder is in the range described above, the function of an amphoteric binder that contributes to an enhancement of cycle characteristics by sufficiently binding a negative electrode material in the negative electrode active material layer can be sufficiently exhibited.

The negative electrode active material layer may further contain a conventionally known binder in addition to the above-mentioned amphoteric binder. Examples of such a binder include components that constitute the hydrophilic unit and the hydrophobic unit described above. Meanwhile, it is more preferable that the content of the binder other than the amphoteric binder described above in the negative electrode active material layer is smaller. The proportion occupied by the predetermined amphoteric binder in the total amount of the binder is preferably 50% by mass or more, more preferably 70% by mass or more, even more preferably 80% by mass or more, still more preferably 90% by mass or more, particularly preferably 95% by mass or more, and most preferably 100% by mass.

The negative electrode active material layer may further include a conductive aid or a lithium salt as another component, and it is particularly preferable that the negative electrode active material layer includes a conductive aid. The components that are preferably added to the shell portion of the negative electrode material described above can be similarly preferably used. The content of the conductive aid (excluding the amount included in the negative electrode material described above) in the negative electrode active material layer is not particularly limited; however, the content of the conductive aid is preferably 0.5% to 5% by mass, and more preferably 1% to 3% by mass, with respect to 100% by mass of the total solid content (sum of solid contents of all members) of the negative electrode active material layer.

(Lithium salt) Examples of the lithium salt include lithium salts of inorganic acids, such as $LiPF_6$, $LiBF_4$, $LiSbF_6$, $LiAsF_6$, and $LiClO_4$; lithium salts of organic acids, such as $LiN(CF_3SO_2)_2$, $LiN(C_2F_5SO_2)_2$, and $LiC(CF_3SO_2)_3$; and the like. Among them, from the viewpoints of the battery output and charge-discharge cycle characteristics, $LiPF_6$ is preferred.

In regard to the bipolar secondary battery of the present embodiment, the thickness of the negative electrode active material layer is not particularly limited, and conventionally known information on batteries can be referred to as appropriate. For instance, the thickness of the negative electrode active material layer is usually about 1 to 500 μm, and preferably 2 to 300 μm, in consideration of the purpose of use of the battery (emphasis of output power, emphasis of energy, and the like) and ion conductivity.

The detailed mechanism by which the present invention provides the above-described effects is not clearly understood; however, the mechanism is speculated as follows. The technical scope of the present invention is not limited to the following mechanism.

That is, as described above, the silicon-based negative electrode active material particles and/or tin-based negative electrode active material can achieve high energy density compared to the conventional carbon/graphite-based negative electrode material. However, the silicon-based negative electrode active material particles and/or tin-based negative electrode active material have a property of causing a large volume change (about 4 times) at the time of alloying with Li. Therefore, due to this volume change at the time of charging and discharging, even if a conductive aid is used, the conductive network in the negative electrode active material layer may be destroyed. In contrast, the core-shell type negative electrode material according to the present invention is configured such that the particle size of the silicon-based negative electrode active material particles and/or tin-based negative electrode active material particles included in the shell portion becomes sufficiently small with respect to the particle size of the carbonaceous negative electrode active material particles that constitute the core portion. Therefore, an effect of enhancing the discharge capacity can be obtained while the influence of the volume change of the silicon-based negative electrode active material particles and/or tin-based negative electrode active material particles at the time of charging and discharging is suppressed to the minimum. Furthermore, in the shell portion, a polyimide is included as a base material, and silicon-based negative electrode active material particles and/or tin-based negative electrode active material particles are fixed to the periphery of the core portion (carbonaceous negative electrode active material particles). Since this polyimide becomes capable of permeating electrons and ions by being reduced, even without being carbonized, the polyimide can contribute to the maintenance of a conductive network. As a result, it is believed that the polyimide can thereby contribute to a reduction of the amount of the conductive aid that is included in the negative electrode active material layer and to an increase in the content of a material that can function as an active material, and thus an extensive increase in the discharge capacity can be brought about.

Furthermore, the hydrophilic unit of the amphoteric binder according to the present invention can interact with the silicon-based negative electrode active material particles and/or tin-based negative electrode active material particles in the negative electrode material. On the other hand, the hydrophobic unit of the amphoteric binder can interact with the carbonaceous negative electrode active material particles in the negative electrode material. It is believed that since the binder in the negative electrode active material layer can thereby sufficiently bind the negative electrode material, the binder can contribute to an enhancement of the cycle characteristics.

(Method for Producing Negative Electrode)

The method for producing a negative electrode is not particularly limited, and a negative electrode can be produced by appropriately referring to a conventionally known technique such as a technique of applying a slurry prepared using an appropriate solvent on the surface of a current collector and drying the slurry, except that the predetermined negative electrode material, the predetermined amphoteric binder, and if necessary, additives such as a conductive aid are used.

[Positive Electrode Active Material Layer]

The positive electrode active material layer contains a positive electrode active material.

(Positive Electrode Active Material)

Examples of the positive electrode active material include such as $LiMn_2O_4$, $LiCoO_2$, $LiNiO_2$, $Li(Ni-Mn-Co)O_2$, lithium-transition metal composite oxides in which a portion of these transition metals have been substituted with other elements, lithium-transition metal phosphate compounds, lithium-transition metal sulfate compounds, and the like. Depending on cases, two or more kinds of positive electrode active materials may be used in combination. Preferably, from the viewpoints of capacity and output characteristics, a lithium-transition metal composite oxide is used as the positive electrode active material. More preferably, a composite oxide containing lithium and nickel is used, and even more preferably, $Li(Ni-Mn-Co)O_2$ and compounds in which a portion of these transition metals have been substituted with other elements (hereinafter, also simply referred to as "NMC composite oxides") are used. A NMC composite oxide has a layered crystal structure in which lithium atom layers and transition metal (Mn, Ni, and Co are disposed in a well-ordered manner) atom layers are alternately stacked, with oxygen atom layers being interposed therebetween, and one Li atom is included per one atom of a transition metal M. Thus, the amount of extractable Li becomes two times the amount of a spinel-based lithium manganese oxide, that is, the feed capability becomes two times, and the NMC composite oxide can have a high capacity.

NMC composite oxides also include, as described above, composite oxides in which a portion of transition metal elements have been substituted with other metal elements. Examples of the other elements in that case include Ti, Zr, Nb, W, P, Al, M, V, Ca, Sr, Cr, Fe, B, Ga, In, Si, Mo, Y, Sn V, Cu, Ag, Zn, and the like; preferably Ti, Zr, Nb, W, P, Al, Mg, V, Ca, Sr, and Cr; more preferably Ti, Zr, P, Al, Mg, and Cr; and from the viewpoint of enhancing the cycle characteristics, even more preferably Ti, Zr, Al, Mg, and Cr.

Since NMC composite oxides have high theoretical discharge capacities, preferably, NMC composite oxides have a composition represented by General Formula (1): $Li_aNi_bMn_cCo_dM_xO_2$ (provided that in the formula, a, b, c, d, and x satisfy the following: $0.9 \leq a \leq 1.2$, $0 < b < 1$, $0 < c \leq 0.5$, $0 < d \leq 0.5$, $0 \leq x \leq 0.3$, and $b+c+d=1$; and M represents at least one element selected from Ti, Zr, Nb, W, P, Al, Mg, V, Ca, Sr, and Cr). Here, a represents the atom ratio of Li, b represents the atom ratio of Ni, c represents the atom ratio of Mn, d represents the atom ratio of Co, and x represents the atom ratio of M. From the viewpoint of cycle characteristics, in regard to General Formula (1), it is preferable that $0.4 \leq b \leq 0.6$. Meanwhile, the composition of the various elements can be measured by, for example, a plasma (ICP) emission analysis method.

Generally, from the viewpoint of increasing the purity of the material and increasing the electron conductivity, nickel (Ni), cobalt (Co), and manganese (Mn) are known to contribute to capacity and output characteristics. Ti and the like substitute a portion of transition metals in the crystal lattices. From the viewpoint of cycle characteristics, it is preferable that a portion of the transition elements are substituted by other metal elements, and particularly, in regard to General Formula (1), it is preferable that $0 < x \leq 0.3$. Since at least one selected from the group consisting of Ti, Zr, Nb, W, P, Al, Mg, V, Ca, Sr, and Cr is solid-solubilized, and thereby the crystal structure is stabilized, as a result, it is considered that even if charging and discharging is repeated, a decrease in the capacity of the battery can be prevented, and excellent cycle characteristics can be realized.

As a more preferred embodiment, in regard to General Formula (1), it is preferable that b, c, and d are such that $0.44 \leq b \leq 0.51$, $0.27 \leq c \leq 0.31$, and $0.19 \leq d \leq 0.26$, from the viewpoint of enhancing the balance between the capacity and the lifetime characteristics. For example, $LiNi_{0.5}Mn_{0.3}Co_{0.2}O_2$ has a higher capacity per unit weight compared to $LiCoO_2$, $LiMn_2O_4$, $LiNi_{1/3}Mn_{1/3}Co_{1/3}O_2$, and the like, which have been proven in batteries for consumer use, and therefore, the compound has an advantage that a compact, high-capacity battery can be produced. The compound is also preferable from the viewpoint of the cruising distance. Meanwhile, from the viewpoint of having a higher capacity, $LiNi_{0.8}Co_{0.1}Al_{0.1}O_2$ is more advantageous. Meanwhile, $LiNi_{0.5}Mn_{0.3}Co_{0.2}O_2$ has excellent lifetime characteristics, like $LiNi_{1/3}Mn_{1/3}CO_{1/3}O_2$.

Depending on cases, two or more kinds of positive electrode active materials may be used in combination. Preferably, from the viewpoints of capacity and output characteristics, a lithium-transition metal composite oxide is used as the positive electrode active material. Meanwhile, it is definitely acceptable that positive electrode active materials other than those described above may be used.

The average particle size of the positive electrode active material included in the positive electrode active material layer is not particularly limited; however, from the viewpoint of output power increase, the average particle size is preferably 1 to 30 μm, and more preferably 5 to 20 μm.

Furthermore, the positive electrode active material layer 15 may contain a binder.

(Binder)

A binder which can be contained in the positive electrode active material layer is added for the purpose of binding one active material with another active material or an active material with a current collector, and maintaining the electrode structure. The binder to be used in the positive electrode active material layer is not particularly limited; however, for example, the following materials may be mentioned. Thermoplastic polymers such as polyethylene, polypropylene, polyethylene terephthalate (PET), polyether nitrile (PEN), polyacrylonitrile, polyimide, polyamide, polyamideimide, cellulose, carboxymethyl cellulose (CMC), an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and hydrogenation products thereof, and a styrene-isoprene-styrene block copolymer and hydrogenation products; fluororesins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride-based fluororubbers such as a vinylidene fluoride-hexafluoropropylene-based fluororubber (VDF-HFP-based fluororubber), a vinylidene fluoride-hexafluoropropylene-tetrafluoroethylene-based fluororubber (VDF-HFP-TFE-based fluororubber), a vinylidene fluoride-pentafluoropropylene-based fluororubber (VDF-PFP-based fluororubber), a vinylidene fluoride-pentafluoropropylene-tetrafluoroethylene-based fluororubber (VDF-PFP-TFE-based fluororubber), a vinylidene fluoride-perfluoromethyl vinyl ether-tetrafluoroethylene-based fluororubber (VDF-PFMVE-TFE-based fluororubber), and a vinylidene fluoride-chlorotrifluoroethylene-based fluororubber (VDF-CTFE-based fluororubber); an epoxy resin; and the like. Among them, polyvinylidene fluoride, polyimide, styrene-butadiene rubber, carboxymethyl cellulose, polypropylene, polytetrafluoroethylene, polyacrylonitrile, polyamide, and polyamideimide are more preferred. These suitable binders have excellent heat resistance, and can be used for an active material layer that has a very wide potential window and is stable to both the positive electrode potential and the negative electrode potential. These binders may be used singly, or two or more kinds thereof may be used in combination.

The amount of the binder included in the positive electrode active material layer is not particularly limited as long as it is an amount capable of binding the active material; however, the amount of the binder is preferably 0.5% to 15% by mass, and more preferably 1% to 10% by mass, with respect to the active material layer.

The positive electrode (positive electrode active material layer) can be formed by any of methods such as a kneading method, a sputtering method, a vapor deposition method, a CVD method, a PVD method, an ion plating method, and a thermal spraying method, in addition to a conventional method of applying (coating) a slurry.

[Electrolyte Layer]

The electrolyte to be used for the electrolyte layer of the present embodiment is not particularly limited, and a liquid electrolyte, a gel polymer electrolyte, or an ionic liquid electrolyte is used without limitations. By using these electrolytes, high lithium ion conductivity can be secured.

A liquid electrolyte has a function as a carrier of lithium ions. The liquid electrolyte that constitutes the electrolyte solution layer has a form in which a lithium salt is dissolved in an organic solvent. Examples of the organic solvent to be used include, for example, carbonates such as ethylene carbonate (EC), propylene carbonate (PC), dimethyl carbonate (DMC), diethyl carbonate (DEC), and ethyl methyl carbonate. Furthermore, regarding the lithium salt, compounds that can be added to the active material layer of an electrode, such as $Li(C_2F_5SO_2)_2N$, $LiPF_6$, $LiBF_4$, $LiClO_4$, $LiAsF_6$, and $LiCF_3SO_3$, can be similarly employed. A liquid electrolyte may further include additives other than the above-mentioned components. Specific examples of such compounds include, for example, fluoroethylene carbonate, vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, 1,1-dimethyl-2-methylene ethylene carbonate, and the like. Among them, fluoroethylene carbonate, vinylene carbonate, methylvinylene carbonate, and vinylethylene carbonate are preferred; and fluoroethylene carbonate, vinylene carbonate, and vinylethylene carbonate are more preferred. These cyclic carbonic acid esters may be used singly, or two or more kinds thereof may be used in combination.

A gel polymer electrolyte has a configuration in which the above-described liquid electrolyte is injected into a matrix polymer (host polymer) formed from an ion conductive polymer. When a gel polymer electrolyte is used as the electrolyte, it is excellent from the viewpoint that fluidity of the electrolyte is lost, and it is easier to block the ion conductivity between various layers. Examples of the ion conductive polymer to be used as the matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA), copolymers of these, and the like.

The matrix polymer of the gel polymer electrolyte can exhibit excellent mechanical strength by forming a crosslinked structure. In order to form a crosslinked structure, a polymerizable polymer for forming a polymer electrolyte (for example, PEO or PPO) may be subjected to a polymerization treatment such as thermal polymerization, ultraviolet polymerization, radiation polymerization, or electron beam polymerization, using an adequate polymerization initiator.

An ionic liquid electrolyte is a product obtainable by dissolving a lithium salt in an ionic liquid. Meanwhile, ionic liquids refer to a series of compounds, each of which is a salt composed only of a cation and an anion, and is a liquid at normal temperature.

It is preferable that the cation component that constitutes the ionic liquid is at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted triazinium ion, and a substituted or unsubstituted ammonium ion.

Specific examples of the anion component that constitutes the ionic liquid include halide ions such as fluoride ion, chloride ion, bromide ion, and iodide ion; nitrate ion ($NO_3^-$), tetrafluoroborate ion ($BF_4^-$), hexafluorophosphate ion ($PF_6^-$), $(FSO_2)_2N^-$, $AlCl_3^-$, lactate ion, acetate ion ($CH_3COO^-$), trifluoroacetate ion ($CF_3COO^-$), methanesulfonate ion ($CH_3SO_3^-$), trifluoromethanesulfonate ion ($CF_3SO_3^-$), bis(trifluoromethanesulfonyl)imide ion (($CF_3SO_2)_2N^-$), bis(pentafluoroethylsulfonyl)imide ion (($C_2F_5SO_2)_2N^-$), $BF_3C_2F_5^-$, tris(trifluoromethanesulfonyl) carbon acid ion (($CF_3SO_2)_3C^-$) perchlorate ion ($ClO_4^-$), dicyanamide ion (($CN)_2N^-$), organic sulfate ion, organic sulfonate ion, $R^1COO^-$, $HOOCR^1COO^-$, $—OOCR^1COO^-$, $NH_2CHR^1COO—$ (at this time, $R^1$ is a substituent and represents an aliphatic hydrocarbon group, an alicyclic hydrocarbon group, an aromatic hydrocarbon group, an ether group, an ester group, or an acyl group, and the above-mentioned substituents may contain a fluorine atom), and the like.

Preferred examples of the ionic liquid include 1-methyl-3-methylimidazolium bis(trifluoromethanesulfonyl)imide, and N-methyl-N-propylpyrrolidium bis(trifluoromethanesulfonyl)imide. These ionic liquids may be used singly, or two or more kinds thereof may be used in combination.

The lithium salt to be used for the ionic liquid electrolyte is similar to the lithium salt that is used for the above-mentioned liquid electrolyte. Meanwhile, the concentration of this lithium salt is preferably 0.1 to 2.0 M, and more preferably 0.8 to 1.2 M.

Furthermore, the following additives may be added to the ionic liquid. By including additives, the charge-discharge characteristics at a high rate and the cycle characteristics can be further enhanced. Specific examples of the additives include, for example, fluoroethylene carbonate, vinylene carbonate, ethylene carbonate, propylene carbonate, γ-butyllactone, γvalerolactone, methyl diglyme, sulfolane, trimethyl phosphate, triethyl phosphate, methoxymethylethyl carbonate, fluorinated ethylene carbonate, and the like. These may be used singly, or two or more kinds thereof may be used in combination. The amount of use in the case of using additives is preferably 0.5% to 10% by mass, and more preferably 0.5% to 5% by mass, with respect to the ionic liquid.

In the bipolar secondary battery of the present embodiment, a separator may be used in the electrolyte layer. A separator has a function of retaining an electrolyte and securing lithium ion conductivity between a positive electrode and a negative electrode, and a function as a partition wall between a positive electrode and a negative electrode. Particularly, in a case in which a liquid electrolyte or an ionic liquid electrolyte is used as the electrolyte, it is preferable to use a separator.

Examples of the form of the separator include a separator of a porous sheet formed from a polymer or fibers, a nonwoven separator, which absorb and retain the electrolyte, and the like.

Regarding the separator of a porous sheet formed from a polymer or fibers, for example, a microporous material (microporous membrane) can be used. Examples of a specific form of the porous sheet formed from a polymer or fibers include microporous (microporous membrane) separators formed from polyolefins such as polyethylene (PE) and polypropylene (PP); laminates obtained by laminating a plurality of these (for example, a laminate having a three-layer structure of PP/PE/PP, and the like); hydrocarbon-based resins such as polyimide, aramid, and polyvinylidene fluoride-hexafluoropropylene (PVdF-HFP); glass fibers; and the like.

Regarding the thickness of the microporous (microporous membrane) separator, since the thickness varies depending on the use applications, the thickness cannot be defined definitively. For example, in the use applications of motor driving secondary batteries or the like for electric vehicles (EV), hybrid electric vehicles (HEV), fuel cell vehicles (FCV), and the like, it is desirable that the microporous separator is a single layer or a multilayer, and the thickness is 4 to 60 μm. It is desirable that the micropore diameter of the microporous (microporous membrane) separator is 1 μm or less at the maximum (usually, having a pore size of about several ten nm).

Regarding the nonwoven separator, conventionally known ones of cotton, rayon, acetate, nylon, polyester; polyolefins such as PP and PE; polyimide, aramid, and the like are used singly or as mixtures. Furthermore, the apparent density of the nonwoven fabric may be any density with which sufficient battery characteristics are obtainable by the impregnated polymer gel electrolyte, and there are no particular limitations. Furthermore, the thickness of the nonwoven fabric separator may be the same as that of the electrolyte layer, and the thickness is preferably 5 to 200 μm, and particularly preferably 10 to 100 μm.

Furthermore, it is preferable that the separator is a separator obtained by laminating a heat resistant insulating layer on a porous base (heat resistant insulating layer-attached separator). The heat resistant insulating layer is a ceramic layer containing inorganic particles and a binder. For the heat resistant insulating layer-attached separator, one having high heat resistance with a melting point or heat softening point of 150° C. or higher, and preferably 200° C. or higher, is used. By having a heat resistant insulating layer, the internal stress of the separator that increases at the time of temperature increase is relieved, and therefore, an effect of suppressing thermal shrinkage can be obtained. As a result, since induction of short circuits between electrodes of the battery can be prevented, a battery configuration in which performance deterioration caused by temperature increase does not easily occur is obtained. Furthermore, by having a heat resistant insulating layer, the mechanical strength of the heat resistant insulating layer-attached separator is increased, and membrane breakage of the separator does not easily occur. Furthermore, due to an effect of suppressing thermal shrinkage and high mechanical strength, curling of the separator does not easily occur in the production process for batteries.

The inorganic particles in the heat resistant insulating layer contribute to the mechanical strength or the effect of suppressing thermal shrinkage of the heat resistant insulating layer. The material to be used for the inorganic particles is not particularly limited. Examples include oxides of silicon, aluminum, zirconium, and titanium ($SiO_2$, $Al_2O_3$, $ZrO_2$, and $TiO_2$), hydroxides, nitrides, and composites of these. These inorganic particles may be particles originating from mineral resources such as boehmite, zeolite, apatite, kaolin, mullite, spinel, olivine, and mica, or may be artificially produced particles. Furthermore, regarding these inorganic particles, only one kind thereof may be used alone, or two or more kinds thereof may be used in combination. Among these, from the viewpoint of cost, it is preferable to use silica ($SiO_2$) or alumina ($Al_2O_3$), and it is more preferable to use alumina ($Al_2O_3$).

The basis weight of the heat resistant particles is not particularly limited; however, the basis weight is preferably 5 to 15 $g/m^2$. When the basis weight is in this range, sufficient ion conductivity is obtained, and it is preferable from the viewpoint of maintaining heat resistant strength.

The binder for the heat resistant insulating layer has a role of adhering inorganic particles to each other, or adhering inorganic particles to a resin porous base layer. By means of this binder, the heat resistant insulating layer is stably formed, and detachment between the porous base layer and the heat resistant insulating layer is prevented.

The binder to be used for the heat resistant insulating layer is not particularly limited, and for example, compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate can be used as the binder. Among these, it is preferable to use carboxymethyl cellulose (CMC), methyl acrylate, or polyvinylidene fluoride (PVDF). These compounds may be used singly, or two or more kinds thereof may be used in combination.

The content of the binder in the heat resistant insulating layer is preferably 2% to 20% by weight with respect to 100% by weight of the heat resistant insulating layer. When the content of the binder is 2% by weight or more, the peeling strength between the heat resistant insulating layer and the porous base layer can be increased, and the resistance to vibration of the separator can be enhanced. On the other hand, when the content of the binder is 20% by weight or less, since gaps between the inorganic particles are appropriately maintained, sufficient lithium ion conductivity can be secured.

The thermal shrinkage factor of the heat resistant insulating layer-attached separator is preferably 10% or less in both the MD and the TD after storage for one hour under the conditions of 150° C. and 2 gf/cm$^2$. By using such a highly heat resistant material, even when the amount of heat generation is increased and the battery internal temperature reaches 150° C., shrinkage of the separator can be effectively prevented. As a result, since induction of short circuits between electrodes of the battery can be prevented, a battery configuration in which performance deterioration caused by temperature increase does not easily occur is obtained.

[Positive Electrode Current Collecting Plate and Negative Electrode Current Collecting Plate]

The material that constitutes the current collecting plate (25, 27) is not particularly limited, and any known highly conductive material that is conventionally used as a current collecting plate for a lithium ion secondary battery can be used. As the constituent material for the current collecting plate, for example, metal materials such as aluminum, copper, titanium, nickel, stainless steel (SUS), and alloys of these are preferred. From the viewpoints of light weight, corrosion resistance, and high conductivity, the material is more preferably aluminum or copper, and particularly preferably aluminum. Meanwhile, for the positive electrode current collecting plate 27 and the negative electrode current collecting plate 25, the same material may be used, or different materials may be used.

[Positive Electrode Lead and Negative Electrode Lead]

Furthermore, although not shown in the diagram, the current collector 11 and the current collecting plate (25, 27) may be electrically connected through a positive electrode lead or a negative electrode lead. Regarding the constituent material for the positive electrode and the negative electrode lead, any known material that is used for lithium ion secondary batteries can be similarly employed. Meanwhile, it is preferable that a portion taken out from the outer casing is coated with a heat shrinking tube having heat resistant insulating properties or the like, in order to prevent the portion from affecting a manufactured product (for example, an automobile part, particularly electronic equipment or the like) by coming into contact with peripheral devices, wiring, and the like and causing short circuit.

[Seal Part]

A seal part (insulating layer) has a function of preventing contact between current collectors or a short circuit at the terminal of a single battery layer. The material that constitutes the seal part may be any material having insulating properties, sealability against the fallout of a solid electrolyte or sealability against moisture permeation from the outside (sealing performance), heat resistance at the battery operation temperature, and the like. For example, an acrylic resin, a urethane resin, an epoxy resin, a polyethylene resin, a polypropylene resin, a polyimide resin, a rubber (ethylene-propylene-diene rubber: EPDM), and the like can be used. Furthermore, an isocyanate-based adhesive, an acrylic resin-based adhesive, a cyanoacrylate-based adhesive, or the like may be used, or a hot melt adhesive (a urethane resin, a polyamide resin, or a polyolefin resin) or the like may be used. Among them, from the viewpoints of corrosion resistance, chemical resistance, ease of production (film-forming properties), economic efficiency, and the like, a polyethylene resin or a polypropylene resin is preferably used as the constituent material for the insulating layer, and it is preferable to use a resin having a non-crystalline polypropylene resin as a main component and having ethylene, propylene, and butane copolymerized therewith.

[Battery Outer Casing Body]

As the battery outer casing body, a known metal can case can be used, and in addition to that, as illustrated in FIG. 1, a pouch-shaped case produced using a laminate film 29 containing aluminum, which can cover the power generating element, can be used. Regarding the laminate film, for example, a laminate film having a three-layer structure formed by laminating PP, aluminum, and nylon in this order, and the like can be used; however, the laminate film is not limited to these. From the viewpoint that the output increase or cooling performance is excellent, and the material can be suitably utilized in a battery for large-sized equipment for use in EV and HEV, a laminate film is desirable. Furthermore, from the viewpoint that the group pressure applied to the power generating element from the outside can be easily adjusted, and the thickness of the electrolyte solution layer can be easily adjusted to a desired thickness, the outer casing body is more preferably an aluminate laminate.

With regard to the bipolar secondary battery of the present embodiment, the output characteristics at a high rate can be enhanced by configuring the negative electrode active material layer as described above. Therefore, the bipolar secondary battery of the present embodiment is suitably used as a power supply for driving EV and HEV.

[Cell Size]

Figure 2:
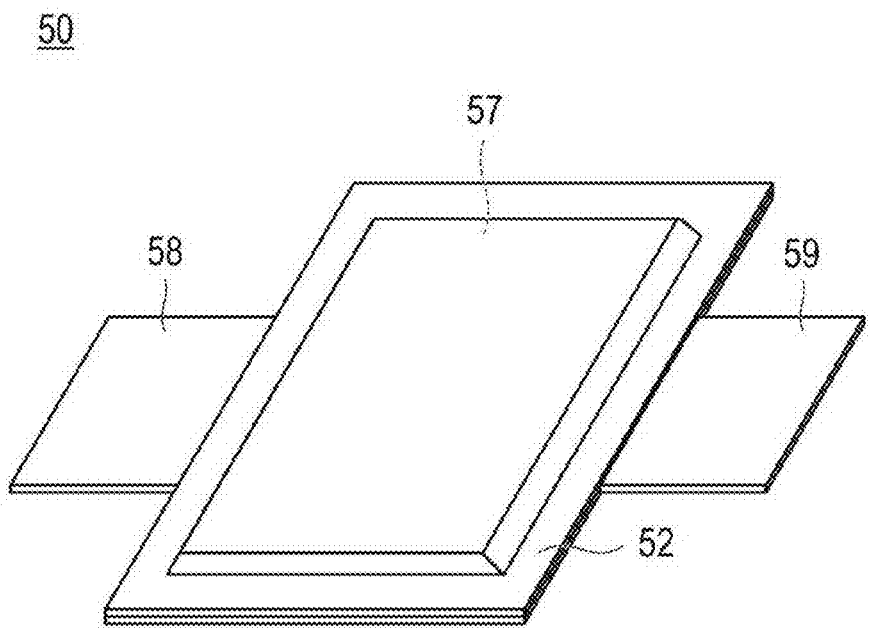
FIG. 2 is a perspective view illustrating the external appearance of a flat lithium ion secondary battery as a representative embodiment of secondary batteries.

FIG. 2 is a perspective view illustrating the external appearance of a flat lithium ion secondary battery according to a representative embodiment of secondary batteries.

As shown in FIG. 2, a flat bipolar secondary battery 50 has a rectangular-shaped flat shape, and at two lateral sides of the battery, a positive electrode tab 58 and a negative electrode tab 59 for extracting electric power are drawn out. A power generating element 57 is wrapped by the battery outer casing body (laminate film 52) of the bipolar secondary battery 50, and the periphery is thermally used. Thus, the power generating element 57 is tightly sealed in a state of having the positive electrode tab 58 and the negative electrode tab 59 drawn outside. Here, the power generating element 57 corresponds to the power generating element 21 of the bipolar secondary battery 10 illustrated in FIG. 1 explained previously. The power generating element 57 is formed by a plurality of bipolar electrodes 23 laminated together, with electrolyte layers 17 being interposed therebetween.

Meanwhile, the lithium ion secondary battery is not intended to be limited to a laminated type, flat-shaped battery. In a wound type lithium ion secondary battery, a cylindrically shaped battery is also acceptable, and a battery produced by modifying such a cylindrical-shaped battery into a rectangular, flat-shaped battery is acceptable as well. Thus, there are no particular limitations. Regarding the cylindrically shaped battery, a laminate film may be used for the outer casing body, or a conventional cylindrical can (metal can) may be used. Thus, there are no particular limitations. Preferably, the power generating element is packaged with an aluminum laminate film. By means of this form, weight reduction can be achieved.

Furthermore, with regard to the ejection of the tabs 58 and 59 illustrated in FIG. 2, there are no particular limitations. The positive electrode tab 58 and the negative electrode tab 59 may be drawn out from the same side, or the positive electrode tab 58 and the negative electrode tab 59 may be respectively divided into multiple tabs, and the multiple tabs may be ejected from various sides. Thus, the ejection is not limited to the embodiment shown in FIG. 2. Furthermore, in a wound type lithium ion battery, terminals may be formed by utilizing, for example, a cylindrical can (metal can) instead of tabs.

In a general electric vehicle, the battery storing space is about 170 L. In order to store a cell and accessories such as a charging/discharging controlling apparatus in this space, the storing space efficiency of a cell is usually about 50%. The cell loading efficiency in this space becomes the factor dominating the cruising distance of an electric vehicle. When the size of a single cell becomes smaller, the loading efficiency is impaired, and therefore, a cruising distance cannot be secured.

Therefore, according to the present invention, it is preferable that the battery structure having the power generating element covered with an outer casing body is large-sized. Specifically, it is preferable that the length of a short side of a laminate cell battery is 100 mm or more. Such a large-sized battery can be used for vehicle uses. Here, the length of a short side of a laminate cell battery refers to a side having the shortest length. The upper limit of the length of the short side is not particularly limited; however, the length is usually 400 mm or less.

[Volume Energy Density and Rated Discharge Capacity]

In a general electric vehicle, it is an important goal of development to determine how long the mileage (cruising distance) can be made by one-time charging. In consideration of this point, it is preferable that the volume energy density of the battery is 157 Wh/L or higher, and it is preferable that the rated capacity is 20 Wh or higher.

Furthermore, from the viewpoint of a large-sized battery, which is different from the viewpoint of the physical size of the electrodes, the size enlargement of the battery may be defined from the relationship with the battery area or the battery capacity. For example, in the case of a flat stacked type laminate battery, it is preferable that the present invention is applied to a battery for which the value of the ratio of the battery area (projected area of the battery including the battery outer casing body) with respect to the rated capacity is 5 $cm^2$/Ah or higher, and the rated capacity is 3 Ah or higher.

[Assembled Battery]

An assembled battery is formed by connecting a plurality of batteries. More particularly, an assembled battery is formed by using at least two or more batteries and connecting them in series or in parallel, or in both ways. By connecting batteries in series or in parallel, the capacity and the voltage can be freely regulated.

A small-sized assembled battery capable of mounting and demounting can be formed by connecting a plurality of batteries in series or in parallel. Then, by connecting a plurality of these small-sized assembled batteries capable of mounting and demounting in series or in parallel, an assembled battery having a large capacity and large output power, which is appropriate for a vehicle driving power supply or an auxiliary power supply, where high volume energy density and high volume output density are required, may be formed. How many batteries should be connected to produce an assembled battery, and how many layers of small-sized assembled batteries should be stacked to produce an assembled battery of large capacity, may be determined according to the battery capacity or output power of the vehicle (electric vehicle) to be loaded.

[Vehicle]

The non-aqueous electrolyte secondary battery of the present embodiment maintains the discharge capacity even after a long-term use, and has satisfactory cycle characteristics. Furthermore, the volume energy density is high. With regard to vehicle uses such as an electric vehicle, a hybrid electric vehicle, a fuel cell vehicle, a hybrid fuel cell vehicle, and the like, high capacity and large size are required as compared to electrical and portable electronic equipment use, and also, lengthening of the service life is needed. Therefore, the non-aqueous electrolyte secondary battery can be suitably utilized as a power supply for vehicles, for example, as a vehicle driving power supply or an auxiliary power supply.

Specifically, a battery or an assembled battery formed by combining a plurality of these batteries can be loaded in a vehicle. In the present invention, since a battery having excellent long-term reliability and output characteristics and a long lifetime can be constructed, when such a battery is loaded, a plug-in hybrid electric vehicle having a long EV mileage or an electric vehicle having a long mileage per charge can be constructed. It is because when a battery or an assembled battery obtained by formed by combining a plurality of these batteries is used in, for example, in the case of an automobile, a hybrid vehicle, a fuel cell vehicle, an electric car (all including four-wheeled vehicles (commercial cars such as a passenger car, a truck, and a bus, a compact car, and the like) as well as two-wheeled vehicles (a motorbike) and three-wheeled vehicles), automobiles having long lifetimes and high reliability are obtained. However, the use applications are not intended to be limited to automobiles, and application can also be made to, for example, various power supplies for other vehicles, for example, mobile bodies such as an electric train. It is also possible to utilize the battery as an installed power supply such as an uninterruptible power supply apparatus.

EXAMPLES

Hereinafter, the present invention will be described in more detail by way of Examples. However, the technical scope of the present invention is not intended to be limited only to the following Examples. Meanwhile, unless particularly stated otherwise, the unit "parts" means "parts by mass". Furthermore, the processes up to the production of a non-aqueous electrolyte secondary battery were all carried out in a dry room.

Production Example

Binder Production Example 1

In a personal synthesis apparatus (manufactured by EYELA Rikakikai Co., Ltd., ChemiStation) of a 100-mL test tube container equipped with a stirrer, a temperature sensor, a nitrogen line, a vacuum line, and a reflux adaptor, 1.0 g of a methacryl-modified butadiene rubber (manufactured by Kuraray Co., Ltd., L-1253, number average molecular weight 7,000 (value obtained by GPC and calculated relative to polystyrene standards), having a methacryloyl group at a single terminal), 7.0 g of acrylic acid, 14 g of toluene, and 14 g of DMF were introduced, and a monomer mixture solution was prepared. Next, while the monomer mixture solution thus prepared was stirred at a stirring speed of 400 rpm, nitrogen was blown for one minute, and then a pressure reduction operation was performed for one minute. This operation was repeated five times to accomplish nitrogen purging. Subsequently, the monomer mixture solution was heated to 65° C., and an initiator mixture solution obtained by dissolving 0.01 g of 2,2'-azobis(2,4-dimethylvaleronitrile) in 1 g of toluene and 1 g of DMF was added thereto. Radical polymerization was carried out for 2 hours. Next, the same initiator mixture solution as that described above was added again, and the reaction was continued for another 2 hours. Then, an initiator mixture solution obtained by dissolving 0.005 g of 2,2'-azobis(2,4-dimethylvaleronitrile) in 1 g of toluene and 1 g of DMF was added thereto, and the reaction was carried out for 2 hours. Thus, a binder solution (1) having a resin concentration of 20% by mass was obtained. Meanwhile, the weight average molecular weight (Mw: calculated relative to polyethylene glycol standards) of the binder (copolymer of polyacrylic acid and butadiene rubber) included in the binder solution (1) thus obtained was measured by GPC, and the weight average molecular weight was 58,000. The measurement conditions for GPC employed at the time of measuring the weight average molecular weight of the binder were as follows.

Measurement apparatus: HLC-8120GPC (manufactured by Tosoh Corp.)
Eluent: Water/methanol (1/1 volume ratio) KCl solution
Standard substance: Polyethylene glycol
Sample concentration: 0.5 mg/mL
Column stationary phase: (Tosoh TSK GL6000 PWXL, GL3000 PWXL, and GL2500 PWXL were connected and used)
Column temperature: 40° C.

Binder Production Example 2

In a personal synthesis apparatus (manufactured by EYELA Rikakikai Co., Ltd., ChemiStation) of a 100-mL test tube container equipped with a stirrer, a temperature sensor, a nitrogen line, a vacuum line, and a reflux adaptor, 0.1 g of a methacryl-modified butadiene rubber (manufactured by Kuraray Co., Ltd., L-1253, number average molecular weight 7,000 (value obtained by GPC and calculated relative to polystyrene standards), having a methacryloyl group at a single terminal), 7.9 g of acrylic acid, 14 g of toluene, and 14 g of N,N-dimethylformamide (DMF) were introduced, and a monomer mixture solution was prepared. Next, while the monomer mixture solution thus prepared was stirred at a stirring speed of 400 rpm, nitrogen was blown for one minute, and then a pressure reduction operation was performed for one minute. This operation was repeated five times to accomplish nitrogen purging. Subsequently, the monomer mixture solution was heated to 65° C., and an initiator mixture solution liquid obtained by dissolving 0.01 g of 2,2'-azobis(2,4-dimethylvaleronitrile) in 1 g of toluene and 1 g of DMF was added thereto. Radical polymerization was carried out for 2 hours. Next, the same initiator mixture solution as that described above was added again, and the reaction was continued for another 2 hours. Then, an initiator mixture solution obtained by dissolving 0.005 g of 2,2'-azobis(2,4-dimethylvaleronitrile) in 1 g of toluene and 1 g of DMF was added thereto, and the reaction was carried out for 2 hours. Thus, a binder solution (2) having a resin concentration of 20% by mass was obtained. Meanwhile, the weight average molecular weight (Mw: calculated relative to polyethylene glycol standards) of the binder (copolymer of polyacrylic acid and butadiene rubber) included in the binder solution (2) thus obtained was measured by GPC, and the weight average molecular weight was 49,000.

Polyamic Acid Production Example 1

According to the technique described in Example 1 of JP 2008-144159 A, polyamic acid (1) in the form of a solution was synthesized using 3,3',4,4'-biphenyltetracarboxylic acid dianhydride and 4,4-diaminodiphenyl ether as raw materials. At this time, N-methyl-2-pyrrolidone (NMP) was used as a solvent, and after a small amount of water was added to this, the reaction was carried out. The weight average molecular weight (Mn: calculated related to polystyrene standards) of the polyamic acid thus obtained was measured by gel permeation chromatography (GPC), and it was about 2,000.

Negative Electrode Material Production Example 1

The following materials were weighed in predetermined amounts and mixed:

Carbonaceous negative electrode active material particles: CARBOTRON (registered trademark) PS(F) (manufactured by Kureha Battery Materials Japan Co., Ltd., average particle size (D50)=20 μm), which is a hard carbon (HC)
Silicon-based negative electrode active material: SiO particles (manufactured by Osaka Titanium Technologies Co., Ltd., average particle size (D50)=1 μm), which is an oxide of silicon
NMP solution of the polyamic acid (Mw=about 2,000) obtained in Polyamic Acid Production Example 1
Conductive aid: DENKA BLACK (registered trademark) HS-100 (manufactured by Denka Co., Ltd.), which is acetylene black
Solvent for viscosity adjustment: NMP At this time, the amount of addition of the silicon-based negative electrode active material particles (SiO particles) was regulated to be 10% by mass with respect to 100% by mass of the amount of addition of the carbonaceous negative electrode active material particles (hard carbon). Furthermore, the amount of the conductive aid (acetylene black) was regulated to be 2.3% by mass with respect to 100% by mass of the total amount of addition of the active material particles. Moreover, the amount of addition (solid content) of polyamic acid was regulated to be 7.5% by mass with respect to 100% by mass of the total amount of addition of the active material particles.

The mixture thus obtained was stirred and mixed using an AWATORI RENTARO (ARE-310, manufactured by Thinky Corp.), and thereby a negative electrode material precursor slurry was produced.

Next, the negative electrode material precursor slurry thus produced was dried by pouring it onto a stainless steel foil on a hot plate set at 80° C., was finely loosened, and then was further dried for 6 hours in a vacuum dryer at 80° C. The dried product thus obtained was sufficiently crushed using an agate mortar, and the resultant was classified using a sieve having a mesh size of 105 μm to eliminate large lumps. Thus, a negative electrode material precursor powder was produced.

Figure 3:
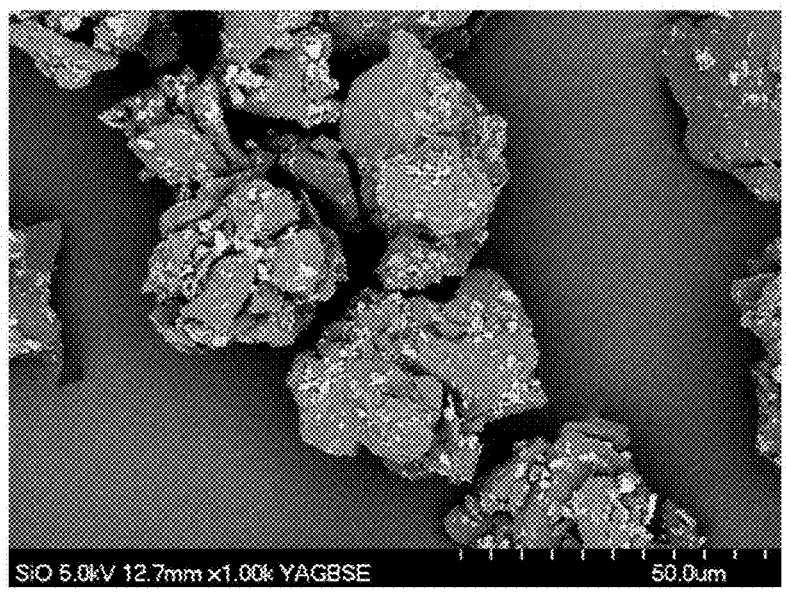
FIG. 3 is a photograph showing an image (backscattered electron image) obtained by observing the negative electrode material (1) produced in the Negative Electrode Material Production Example 1 that will be described below, using a scanning electron microscope (SEM).

Subsequently, the negative electrode material precursor powder thus obtained was introduced into a glass bottle, and in an argon atmosphere, the glass bottle was introduced into an alumina vessel inside a muffle furnace, and the temperature was increased from room temperature to 350° C. over one hour. The temperature was maintained at 350° C. for one hour, subsequently the material was left to cool to room temperature, and thereby the polyamic acid was converted to polyimide. The powder thus obtained was crushed using an agate mortar, and thus negative electrode material (1) was produced. FIG. 3 is a photograph showing an image (backscattered electron image) obtained by observing the negative electrode material (1) produced as such using a scanning electron microscope (SEM). The powder appearing in white in the photograph shown in FIG. 3 is SiO particles, and it can be seen that the SiO particles are appropriately adhering to the surface of hard carbon particles. Meanwhile, since it is difficult to observe a polyimide component under the SEM observation conditions, in FIG. 3, the presence of polyimide cannot be verified.

Negative Electrode Material Production Example 2

Negative electrode material (2) was produced by the same technique as that of the Negative Electrode Material Production Example 1 described above, except that the amount of addition of the silicon-based negative electrode active material particles (SiO particles) at the time of producing the negative electrode material precursor slurry was changed to 5% by mass with respect to 100% by mass of the amount of addition of the carbonaceous negative electrode active material particles (hard carbon).

Production Example for Non-Aqueous Electrolyte Secondary Battery

Example 1

As a liquid electrolyte, a solution was prepared by dissolving a lithium salt ($LiPF_6$) in a solvent (an equivolume mixture of ethylene carbonate (EC) and diethyl carbonate (DEC)) at a concentration of 1 mol/L, and further dissolving fluoroethylene carbonate (FEC) at a concentration of 5% by mass in 100% by mass of the solution.

On the other hand, 100 parts by mass of the negative electrode material (1) prepared in the Negative Electrode Material Production Example 1 described above, 1 part by mass of acetylene black as a conductive aid, and 10 parts by mass (in terms of solid content) of the binder solution (1) produced as described above were weighed and dispersed in the above-mentioned solvent, and thus, a slurry for negative electrode active material layer was prepared.

On the other hand, a copper foil (thickness: 20 μm) was prepared as a negative electrode current collector. Then, the slurry for negative electrode active material layer prepared as described above was applied on one surface of the negative electrode current collector, and thereby a coating film was formed. Next, this coating film was dried at 90° C. to 100° C. Subsequently, the negative electrode thus obtained was punched into a circle form having a diameter of 05 mm using a punch, and thus an electrode (negative electrode) for test was obtained.

Subsequently, a lithium metal foil (thickness: 300 μm) as a counter electrode was disposed inside an outer can of a coin cell, and three sheets of a separator (thickness: 25 μm) formed from a microporous film made of polypropylene were placed on this lithium metal foil. The electrode (negative electrode) for test produced as described above was further placed thereon. The liquid electrolyte prepared as described above was injected into a power generation element obtained in this manner, and a spacer, a spring, and an upper lid were further stacked in this order. The upper lid was fixed with a thumbscrew, and a coin cell (CR2032: non-aqueous electrolyte secondary battery) of the present Example was obtained.

Example 2

A coin cell (non-aqueous electrolyte secondary battery) of the present Example was produced by the same technique as that of the Example 1 described above, except that the binder solution (2) produced as described above was used instead of the binder solution (1).

Example 3

A coin cell (non-aqueous electrolyte secondary battery) of the present Example was produced by the same technique as that of the Example 2 described above, except that the negative electrode material (2) produced as described above was used instead of the negative electrode material (1).

Comparative Example 1

A coin cell (non-aqueous electrolyte secondary battery) of the present Comparative Example was produced by the same technique as that of the Example 1 described above, except that a polyacrylic acid (manufactured by Sigma-Aldrich Corp., weight average molecular weight (Mw)=125,000) was used as a binder.

[Evaluation Example for Non-Aqueous Electrolyte Secondary Battery (Measurement of Discharge Capacity)]

For the coin cells (non-aqueous electrolyte secondary battery) produced in Examples and Comparative Examples described above, charging and discharging was carried out under the following conditions, and the discharge capacity and the capacity retention were measured.

First, for each cell, a cycle of charging at CC-CV to 5 mV (with respect to lithium metal counter electrode) with a current of 1/20 C relative to the theoretical charge capacity of the electrode, and then discharging by CC to 1.5 V was repeated. At this time, a rest of 5 minutes was inserted between charging and discharging, and the discharge capacity of the 50th cycle was measured. Furthermore, the retention (%) of the discharge capacity of the 50th cycle with respect to the discharge capacity of the second cycle was calculated. These results are presented in the following Table 1. Meanwhile, the values shown in Table 1 are values obtained using the values of discharge capacity per unit mass of the sum of the negative electrode active material and the conductive aid in the negative electrode material. Furthermore, the reference of calculation of the discharge capacity retention was defined as the discharge capacity of the second cycle, because the change in discharge capacity from the first cycle to the second cycle is large, and the discharge capacity after the second cycle is relatively stabilized.

TABLE 1

| | Negative electrode material | | | | Negative electrode active material layer | Evaluation of battery performance | |
|---|---|---|---|---|---|---|---|
| | Si-based negative electrode active material (average particle size) | Average particle size ratio (Si-based/HC) | Mass ratio % (Si-based/HC) | Polyimide compositization | Type of binder | Discharge capacity of $50^{th}$ cycle (mAh/g) | Discharge capacity retention (%) |
| Example 1 | SiO particles (1 μm) | 0.05 | 10 | Present | Binder solution (1) | 540 | 93 |
| Example 2 | SiO particles (1 μm) | 0.05 | 10 | Present | Binder solution (2) | 535 | 92 |
| Example 3 | SiO particles (1 μm) | 0.05 | 5 | Present | Binder solution (1) | 460 | 95 |
| Comparative Example 1 | SiO particles (1 μm) | 0.05 | 10 | Present | Polyacrylic acid | 300 | 60 |

From the results shown in Table 1, it can be seen that, when a non-aqueous electrolyte secondary battery (lithium ion secondary battery) is configured using the negative electrode material according to the present invention, the discharge capacity and the cycle characteristics can be further increased. Furthermore, since the technique according to the present invention can be carried out even without performing a heat treatment at a high temperature such as 2,000° C. or higher, special production apparatuses are not needed, and it can be said to be preferable even from the viewpoints of production cost and productivity.

The present patent application is based on Japanese Patent Application No. 2017-59425, filed on Mar. 24, 2017, the disclosure of which is incorporated herein by reference in its entirety.

REFERENCE SIGNS LIST 10, 50 Bipolar secondary battery
11 Current collector
11a Outermost layer current collector on positive electrode side
11b Outermost layer current collector on negative electrode side
13 Positive electrode active material layer
15 Negative electrode active material layer
17 Electrolyte layer
19 Single battery layer
21, 57 Power generating element
23 Bipolar electrode
25 Positive electrode current collecting plate (positive electrode tab)
27 Negative electrode current collecting plate (negative electrode tab)
29, 52 Battery outer casing body
31 Seal part
58 Positive electrode tab
59 Negative electrode tab

The invention claimed is:

1. A negative electrode for a non-aqueous electrolyte secondary battery, comprising:
    a current collector; and
    a negative electrode active material layer formed on a surface of the current collector, the negative electrode active material containing:
        a negative electrode material that includes:
            a core portion including carbonaceous negative electrode active material particles, and
            a shell portion including (i) a polyimide, and (ii) silicon-based negative electrode active material particles and/or tin-based negative electrode active material particles, and
        a binder formed of (i) poly(meth)acrylic acid, and (ii) butadiene rubber or hydrogenated butadiene rubber, which are covalently bonded together;
    wherein a content of the silicon-based negative electrode active material particles and/or tin-based negative electrode active material particles with respect to 100% by mass of a content of the carbonaceous negative electrode active material particles is 2% to 20% by mass; and
    wherein, in the binder, mass proportions of the poly(meth)acrylic acid and the butadiene rubber or hydrogenated butadiene rubber are in a range of 98:2 to 85:15.

2. The negative electrode for a non-aqueous electrolyte secondary battery according to claim 1, wherein a value of a ratio of a volume average particle size (D50) of the silicon-based negative electrode active material particles and/or tin-based negative electrode active material particles with respect to a volume average particle size (D50) of the carbonaceous negative electrode active material particles is 0.001 to 0.1.

3. The negative electrode for a non-aqueous electrolyte secondary battery according to claim 1, wherein the shell portion further includes a conductive aid.

4. The negative electrode for a non-aqueous electrolyte secondary battery according to claim 1, wherein the carbonaceous negative electrode active material particles contain hard carbon.

5. The negative electrode for a non-aqueous electrolyte secondary battery according to claim 1, wherein the silicon-based negative electrode active material particles and/or tin-based negative electrode active material particles contain simple substance of silicon or a silicon oxide.

6. The negative electrode for a non-aqueous electrolyte secondary battery according to claim 1, wherein the polyimide includes an aromatic polyimide.

7. The negative electrode for a non-aqueous electrolyte secondary battery according to claim 1, wherein a content of the binder in the negative electrode active material layer is 0.5% to 10% by mass with respect to 100% by mass of the total solid content.

8. A non-aqueous electrolyte secondary battery, comprising a power generation element including:
    the negative electrode for a non-aqueous electrolyte secondary battery according to claim 1;
    a positive electrode comprising a positive electrode active material layer containing a positive electrode active material on a surface of a current collector; and
    an electrolyte layer disposed between the negative electrode and the positive electrode.

9. The negative electrode for a non-aqueous electrolyte secondary battery according to claim 1, wherein the binder is formed of the poly(meth)acrylic acid unit and the butadiene rubber or hydrogenated butadiene rubber covalently bonded together in a block polymer structure.

10. The negative electrode for a non-aqueous electrolyte secondary battery according to claim 1, wherein, in the binder, mass proportions of the poly(meth)acrylic acid and the butadiene rubber or hydrogenated butadiene rubber are in a range of 97:3 to 87:13.

* * * * *